US010271258B2

(12) United States Patent
Van Der Velde et al.

(10) Patent No.: US 10,271,258 B2
(45) Date of Patent: Apr. 23, 2019

(54) COMMUNICATION UNITS, INTEGRATED CIRCUITS AND METHODS THEREFOR

(71) Applicant: Samsung Electronics Co., Ltd., Gyeonggi-do (KR)

(72) Inventors: Himke Van Der Velde, Middlesex (GB); Gert Jan Van Lieshout, Middlesex (GB); Kyeong-In Jeong, Gyeonggi-do (KR); Mangesh Abhimanyu Ingale, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 14/907,546

(22) PCT Filed: Jul. 23, 2014

(86) PCT No.: PCT/KR2014/006715
§ 371 (c)(1),
(2) Date: Jan. 25, 2016

(87) PCT Pub. No.: WO2015/012598
PCT Pub. Date: Jan. 29, 2015

(65) Prior Publication Data
US 2016/0183154 A1 Jun. 23, 2016

(30) Foreign Application Priority Data

Jul. 23, 2013 (GB) .................................. 1313122.2

(51) Int. Cl.
*H04W 12/00* (2009.01)
*H04W 36/30* (2009.01)
*H04W 36/00* (2009.01)
*H04L 29/08* (2006.01)
*H04W 36/04* (2009.01)

(52) U.S. Cl.
CPC .......... *H04W 36/30* (2013.01); *H04L 69/325* (2013.01); *H04W 36/0083* (2013.01); *H04W 36/0085* (2018.08); *H04W 36/04* (2013.01)

(58) Field of Classification Search
None
See application file for complete search history.

(56) References Cited

U.S. PATENT DOCUMENTS

2012/0115463 A1* 5/2012 Weng .................... H04L 1/0026
455/425
2012/0147860 A1 6/2012 Ramesh et al.
(Continued)

OTHER PUBLICATIONS

International Search Report dated Sep. 25, 2014 in connection with International Application No. PCT/KR2014/006715; 3 pages.
(Continued)

Primary Examiner — Alex Skripnikov
Assistant Examiner — Lionel Preval

(57) ABSTRACT

A method for moving between cells by a wireless device includes receiving instructions for the wireless device to measure and report a gradient change value to apply offsets based on a plurality of speed states; identifying a speed state in which a moving speed of the wireless device is included among the plurality of speed states; obtaining an offset mapped to the speed state; first filtering a received wireless signal at a physical layer and second filtering the received wireless signal at a radio resource control layer; calculating the gradient change value corresponding to the obtained offset. The gradient change value indicates a rate of change of received signal strength with a serving cell or a rate of received signal strength difference between a neighbor cell and the serving cell. A portion of the second filtering of the received wireless signal is determined based on the calculated gradient change value.

22 Claims, 14 Drawing Sheets

(56) References Cited

U.S. PATENT DOCUMENTS

| | | | |
|---|---|---|---|
| 2013/0023302 A1* | 1/2013 | Sivanesan | H04W 36/32 455/525 |
| 2013/0142094 A1 | 6/2013 | HomChaudhuri et al. | |
| 2013/0295951 A1* | 11/2013 | Mach | H04W 36/32 455/456.1 |
| 2014/0133465 A1* | 5/2014 | Johansson | H04W 24/04 370/332 |
| 2014/0248885 A1* | 9/2014 | Van Lieshout | H04W 36/0094 455/437 |
| 2014/0274049 A1* | 9/2014 | Singh | H04W 36/0083 455/436 |
| 2014/0302851 A1* | 10/2014 | Yiu | H04W 76/00 455/436 |

OTHER PUBLICATIONS

Written Opinion of the International Searching Authority dated Sep. 25, 2014 in connection with International Application No. PCT/KR2014/006715; 5 pages.

"Overall Description: Stage 2: Release X"; E-UTRA & E-UTRAN; 3GPP TS 36.300; V0.1.0; Oct. 2006; 51 pages.

"Protocol Specification: Release 8"; E-UTRA & RRC; 3GPP TS 36.331; V1.0.0; Nov. 2007; 57 pages.

"Mobility Enhancements in Heterogenous Networks: Release 11"; E-UTRA; 3GPP TR 36.839; V0.1.0; Jun. 2011; 13 pages.

* cited by examiner

COMMUNICATION UNITS, INTEGRATED CIRCUITS AND METHODS THEREFOR

CROSS-REFERENCE TO RELATED APPLICATION(S)

The present application claims priority under 35 U.S.C. § 365 to International Patent Application No. PCT/KR2014/006715 filed Jul. 23, 2014, entitled "COMMUNICATION UNITS, INTEGRATED CIRCUITS AND METHODS THEREFOR", and, through International Patent Application No. PCT/KR2014/006715, to British Application No. 1313122.2 filed Jul. 23, 2013, each of which are incorporated herein by reference into the present disclosure as if fully set forth herein.

TECHNICAL FIELD

The field of this invention relates to network elements, a wireless communication system and methods for operating a cellular communication system and has particular applicability to cellular wireless communication in an environment where performance capabilities of communications cells are heterogeneous.

BACKGROUND ART

Wireless communication systems, such as the 3rd Generation (3G) of mobile telephone standards and technology, are well known. An example of such 3G standards and technology is the Universal Mobile Telecommunications System (UMTS™), developed by the 3rd Generation Partnership Project (3GPP™) (www.3gpp.org). The 3rd generation of wireless communications has generally been developed to support macro-cell mobile phone communications. Such macro cells utilise high power base stations (NodeBs in 3GPP™ parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Tub interface.

Communications systems and networks are developing towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. An evolved packet system (EPS) network provides only packet switching (PS) domain data access so that voice services are provided by a 2G or 3G Radio Access Network (RAN) and circuit switched (CS) domain network. User Equipment (UEs) can access a CS domain core network through a 2G/3GRAN such as the (Enhanced Data Rate for GSM Evolution, EDGE) Radio Access Network (GERAN) or a Universal Mobile Telecommunication System Terrestrial Radio Access Network (UTRAN), and access the EPC through the E-UTRAN.

Lower power (and therefore smaller coverage area) cells are a recent development within the field of wireless cellular communication systems. Such small cells are effectively communication coverage areas supported by low power base stations. The terms 'pico cell' and 'femtocell' are often used to mean a cell with a small coverage area, with the term femtocell being more commonly used with reference to residential small cells. Small cells are often deployed with minimum RF (radio frequency) planning and those operating in consumers' homes are often installed in an ad hoc fashion. The low power base stations which support small cells are referred to as Access Points (AP's) with the term Home Node B (HNB) or Evolved Home Node B (eHNB) defined by 3GPP to identify femto cell Access Points. Each small-cell is supported by a single Access Point. These small cells are intended to augment the wide area macro network and support communications to multiple User Equipment devices in a restricted, for example, indoor environment. Such small cells are intended to be able to be deployed 'underneath' a macro cell (in a multi-layer structure, for example) in order to support communications to UEs in a restricted area such as a shopping mall, for example. An additional benefit of small cells is that they can offload traffic from the macro network, thereby freeing up valuable macro network resources. One or more Access Points are linked to a Core Network through an Access Controller. Typical applications for such Access Points include, by way of example, residential and commercial locations, communication 'hotspots', etc., whereby Access Points can be connected to a core network via, for example, the Internet using a broadband connection or the like. In this manner, small cells can be provided in a simple, scalable deployment in specific in-building locations where, for example, network congestion or poor coverage at the macro cell level may be problematic.

Thus, an AP is a scalable, multi-channel, two-way communication device that may be provided within, say, residential and commercial (e.g. office) locations, 'hotspots' etc., to extend or improve upon network coverage within those locations. Although there are no standard criteria for the functional components of an AP, an example of a typical AP for use within a 3GPP 3G system may comprise Node-B functionality and some aspects of Radio Network Controller (RNC) functionality as specified in 3GPP TS 25.467.

Hereinafter, the term 'small cell' encompasses any cell having a relatively small coverage area, and includes 'pico cells' and 'femto cells.' Similarly, hereinafter the term base station encompasses any wireless communications serving station, such as an eNodeB (in 3GPP™) parlance. Likewise, hereinafter the term terminal device encompasses any wireless subscriber communications unit, such as an UE (in 3GPP™) parlance.

It has been established that the technology required to support communication in a macro cell may be different from that required to support communication in, say, a pico cell. Transition of a UE from an established communication channel with a first BS, to establishing communication with another BS, is known as handover. Handover from one macro cell BS to another is widely understood, and has been a characteristic of cellular wireless telephony networks since their inception. However, handover is merely a particular procedure that need not involve a cell change (i.e. intra-cell handover). The procedure for handover between macro cells and small cells is the same as between two macro cells.

DISCLOSURE OF INVENTION

Technical Problem

However, the inventors have recognised that mobility performance is not optimal when small cells and macro cells are deployed on the same frequency. In particular, it has been found that there are more handover (HO) failures for the case of a UE moving from a small cell to a macro cell. In some known cases, this problem may be mitigated by setting certain operational parameters such that handover is triggered earlier; however this may result in what is often referred as ping-pong whilst the UE is moving between the two involved cells.

Thus, a need exists for an improved communication unit and method of reducing handover failures, whilst reducing the number of ping pongs.

Solution to Problem

Accordingly, the invention seeks to mitigate, alleviate or eliminate one or more of the above mentioned disadvantages singly or in any combination. Aspects of the invention provide communication units, integrated circuits, and methods therefor.

These and other aspects of the invention will be apparent from, and elucidated with reference to, the embodiments described hereinafter.

BRIEF DESCRIPTION OF DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

BEST MODE FOR CARRYING OUT THE INVENTION

Examples of the invention will be described in terms of a third generation partnership project (3GPP™) radio access network (RAN) implementation for long term evolved (LTE) systems. However, it will be appreciated by a skilled artisan that the inventive concept herein described may be embodied in any type of cellular communication systems.

In the context of the present invention, the term 'gradient' may encompass a rate of change in signal strength between a target cell and a source cell, for example between a macro cell and a small cell. The gradient is calculated by evaluating the difference in signal strength between a target cell and a source cell at, in one example, substantially equal time intervals. Further, the term 'filtering' may encompass and at least refer to a procedure by which measurement results are smoothened e.g. by averaging, by basing a new value on a combination of the latest and previous measurement results. Furthermore, the term 'scaling' may refer to adjusting the value of a parameter relevant for the triggering of a measurement report depending on some input e.g. the cell change rate (as reflected in mobility state), or the gradient.

Figure 1:
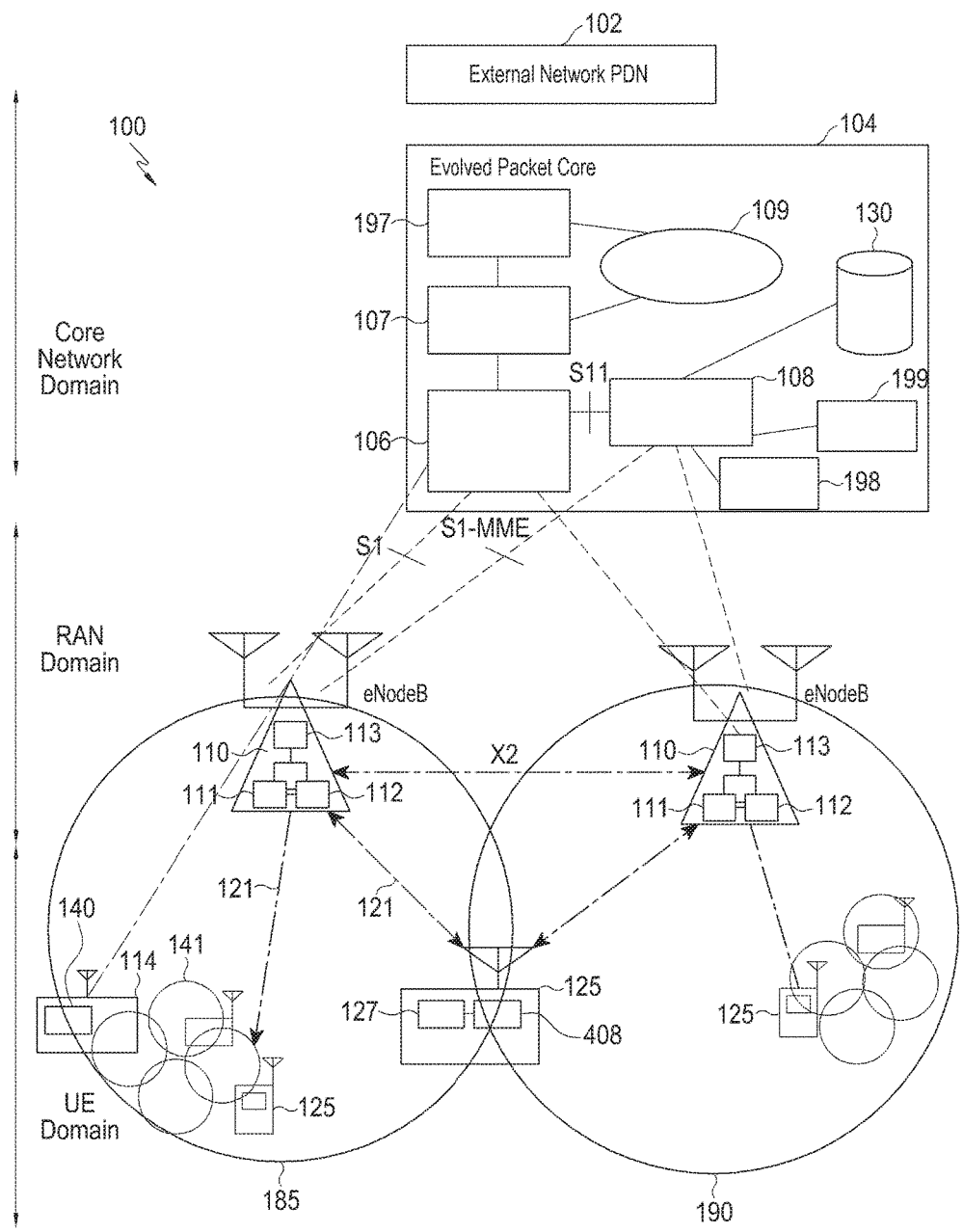
FIG. 1 illustrates an example communication system comprising both macro cells and small cells adapted in accordance with some embodiments of the invention.

Referring now to the drawings, and in particular FIG. 1, an example of part of a 3GPP™ network, adapted in accordance with embodiments of the invention, is illustrated and indicated generally at 100. In this example embodiment, the wireless communication system 100 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined.

In FIG. 1, there is illustrated an example of a communication system comprising both macro cells, for example, eNodeBs 110 and small cells 114, in accordance with one embodiment of the invention. It should be noted that reference to 'small cells' can mean any small cell network element, for example femto or pico cells. In a small cell network it is known that there may be a very large number of small cells per macro cell. Thus, the coverage area of a single macro cell will inevitably encompass a coverage area of a large number of small cells.

The wireless communication system 100 architecture consists of radio access network (RAN) and core network (CN) elements 104, with the core network elements 104 being coupled to external networks 102 (named Packet Data Networks (PDNs)), such as the Internet or a corporate network. The CN elements 104 comprise a packet data network gateway (P-GW) 107. In order to serve up local content, the P-GW may be coupled to a content provider. The P-GW 107 may be further coupled to a policy control and rules function entity (PCRF) 197 and a Gateway 106.

The PCRF 197 is operable to control policy control decision making, as well as for controlling the flow-based charging functionalities in a policy control enforcement function PCEF (not shown) that may reside in the P-GW 107. The PCRF 197 may further provide a quality of service (QoS) authorisation class identifier and bit rate information that dictates how a certain data flow will be treated in the PCEF, and ensures that this is in accordance with a UE's 125 subscription profile.

In example embodiments, the Gateway 106 is a Serving Gateway (S-GW). The Gateway 106 is coupled to a mobility management entity MME 108 via an S11 interface. The MME 108 is operable to manage session control of Gateway bearers and is operably coupled to a home subscriber server (HSS) database 130 that is arranged to store subscriber communication unit 125 (user equipment (UE)) related information. As illustrated, the MME 108 also has a direct connection to each eNodeB 110, via an S1-MME interface.

The HSS database 130 may store UE subscription data such as QoS profiles and any access restrictions for roaming. The HSS database 130 may also store information relating to the P-GW 107 to which a UE 125 can connect. For example, this data may be in the form of an access point name (APN) or a packet data network (PDN) address. In addition, the HSS database 130 may hold dynamic information relating to the identity of the MME 108 to which a UE 125 is currently connected or registered.

The MME 108 may be further operable to control one or more protocols running between the user equipment (UE) 125 and the CN elements 104, which are commonly known as Non-Access Stratum (NAS) protocols. The MME 108 may support at least the following functions that can be classified as: functions relating to bearer management (which may include the establishment, maintenance and release of bearers), functions relating to connection management (which may include the establishment of the connection and security between the network and the UE 125) and functions relating to inter-working with other networks (which may include the handover of voice calls to legacy networks). The Gateway 106 predominantly acts as a mobility anchor point and is capable of providing internet protocol (IP) multicast distribution of user plane data to eNodeBs 110. The Gateway 106 may receive content via the P-GW 107, from one or more content providers 109 or via the external PDN 102. The MME 108 may be further coupled to an evolved serving mobile location centre (E-SMLC) 198 and a gateway mobile location centre (GMLC) 199.

The E-SMLC 198 is operable to manage the overall coordination and scheduling of resources required to find the location of the UE that is attached to the RAN, in this example embodiment the E-UTRAN. The GMLC 199 contains functionalities required to support location services (LCS). After performing an authorisation, it sends positioning requests to the MME 108 and receives final location estimates.

The P-GW 107 is operable to determine IP address allocation for a UE 125, as well as QoS enforcement and flow-based charging according to rules received from the PCRF 197. The P-GW 107 is further operable to control the filtering of downlink user IP packets into different QoS-based bearers (not shown). The P-GW 107 may also serve as a mobility anchor for inter-working with non-3GPP technologies such as CDMA2000 and WiMAX networks.

As the Gateway 106 comprises an S-GW, the eNodeBs 110 would be connected to the S-GW 106 and the MME 108 directly. In this case, all UE packets would be transferred through the S-GW 106, which may serve as a local mobility anchor for the data bearers when a UE 125 moves between eNodeBs 110. The S-GW 106 is also capable of retaining information about the bearers when the UE 125 is in an idle state (known as EPS connection management IDLE), and temporarily buffers downlink data while the MME 108 initiates paging of the UE 125 to re-establish the bearers. In addition, the S-GW 106 may perform some administrative functions in the visited network, such as collecting information for charging (i.e. the volume of data sent or received from the UE 125). The S-GW 106 may further serve as a mobility anchor for inter-working with other 3GPP™ technologies such as GPRS™ and UMTS™.

As illustrated, the CN 104 is operably connected to two eNodeBs 110, with their respective coverage zones or cells 185, 190 and a plurality of UEs 125 receiving transmissions from the CN 104 via the eNodeBs 110. In accordance with example embodiments of the present invention, at least one eNodeB 110 and at least one UE 125 (amongst other elements) have been adapted to support the concepts hereinafter described.

The main component of the RAN is an eNodeB (an evolved NodeB) 110, which performs many standard base station functions and is connected to the CN 104 via an S1 interface and to the UEs 125 via a Uu interface. A wireless communication system will typically have a large number of such infrastructure elements where, for clarity purposes, only a limited number are shown in FIG. 1. The eNodeBs 110 control and manage the radio resource related functions for a plurality of wireless subscriber communication units/terminals (or user equipment (UE)) 125 in UMTS™ nomenclature). Each of the UEs 125 comprise a transceiver unit 127 operably coupled to signal processing logic 208 (with one UE illustrated in such detail for clarity purposes only). The system comprises many other UEs 125 and eNodeBs 110, which for clarity purposes are not shown. In examples, UEs 125 may communicate with an eNodeB via communications link 121.

Clearly, the various components within the eNodeB 110 can be realized in discrete or integrated component form, with an ultimate structure therefore being an application-specific or design selection.

In a small cell scenario, a small cell, also known as an Access Point (AP) 114, may further comprise a controller in a form of an AP controller 140. As will be appreciated by a skilled artisan, an Access Point (AP) 114 is a communication element that facilitates access to a communication network via a communication cell, such as a small-cell. The AP controller 140 may be coupled to the core network (CN) element 104 via an S1 interface, as shown. In this manner, the AP 114 is able to provide voice and data services to a cellular handset, such as UE 125, in a small cell 141 in contrast to the macro cell 185, in the same way as a conventional eNodeB, but with increased deployment simplicity. Due to the lower power and the generally restricted access nature of small cells, neighbour cell links are generally not deemed necessary at the small cellular level.

In accordance with some embodiments of the invention, a serving network element for a cellular communication network, such as eNodeBs 110, comprises a receiver, as illustrated at 111 in the case of eNodeB 110, for receiving radio frequency (RF) signals from at least one wireless communication unit, for example UE 125. The serving network element further comprises a signal processing module, as illustrated at 112 in the case of eNodeB 110, arranged to receive transmit power information relating to at least one further serving network element from the at least one wireless communication unit.

In accordance with examples of the invention, the UE 125 has been modified to facilitate a reduction of handover failures, whilst reducing the number of HO ping pongs.

Figure 2:
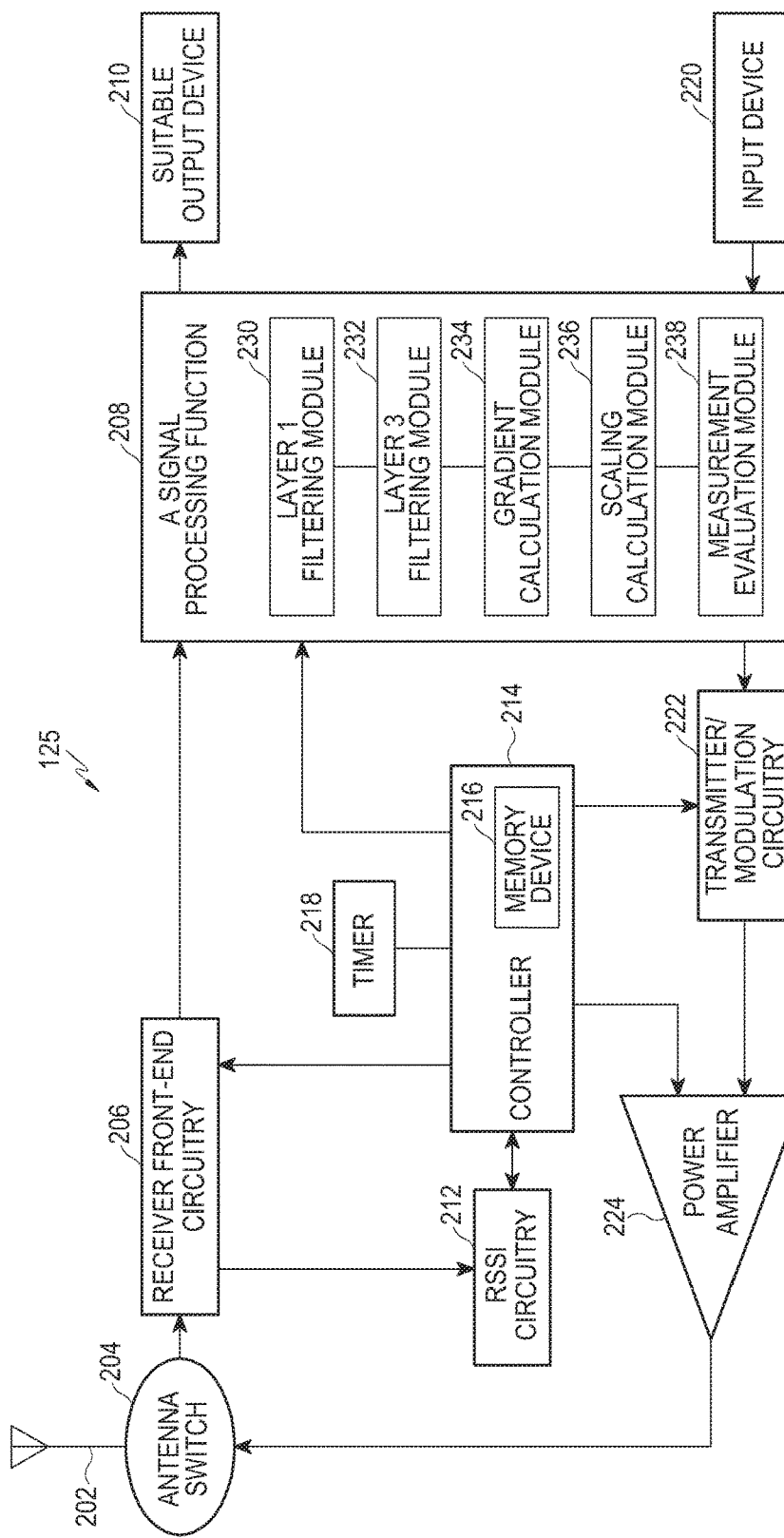
FIG. 2 illustrates an example of some elements of a wireless communication unit adapted in accordance with some embodiments of the invention.

Referring to FIG. 2 a block diagram of a wireless communication unit (sometimes referred to as a mobile subscriber unit (MS) in the context of cellular communications or a user equipment (UE) in terms of a 3rd generation partnership project (3GPP) communication system) is shown, in accordance with a preferred embodiment of the invention. The wireless communication unit 125 contains an antenna 202 preferably coupled to a duplex filter or antenna switch 204 that provides isolation between receive and transmit chains within the UE 125.

The receiver chain, as known in the art, includes receiver front-end circuitry 206 (effectively providing reception, filtering and intermediate or base-band frequency conversion). The front-end circuitry 206 is serially coupled to a signal processing function 208. An output from the signal processing function 208 is provided to a suitable output device 210, such as a screen or flat panel display. The receiver chain also includes received signal strength indicator (RSSI) circuitry 212, which in turn is coupled to a controller 214 that maintains overall subscriber unit control. In some examples, signal processing function 208 may comprise at least one layer 1 filtering module 230, at least one layer 3 filtering module 232, at least one gradient calculation module 234, at least one scaling calculation module 236 and at least one measurement evaluation module 238. In some examples, signal processing module 208 may further comprise additional layer 3 filtering modules.

In some examples, signal processing function 208 may support various signal routing paths between the aforementioned modules, for example as illustrated with respect to FIGS. 8-13.

The controller 214 is also coupled to the receiver front-end circuitry 206 and the signal processing function 208 (generally realised by a digital signal processor (DSP)). The controller 214 is also coupled to a memory device 216 that selectively stores operating regimes, such as decoding/encoding functions, synchronisation patterns, code sequences, received signal power levels and the like.

In some examples, controller 214 may be operable to control UE 125 to implement layer 1 and layer 3 filtering. In this case, controller 214 may be operable to perform layer 1 filtering at the physical layer of a received signal utilising a layer 1 filtering module 230, and perform layer 3 filtering at the radio resource control layer utilising a layer 3 filtering module 232. In some examples, controller 214 may be further operable to instruct a measurement evaluation module 238 to prepare a measurement report based on an evaluation of received signals, which may have been modified by aspects of the invention, for example, by gradient calculation module 234 and/or scaling calculation module 236 and/or additionally by additional layer 3 filtering modules 232.

In some examples, additional layer 3 filtering modules may be implemented prior to and/or after gradient calculation module 234. Various potential configurations of these modules are illustrated with respect to FIGS. 8-13. In one example, the layer 1 filtering may be performed in receiver front-end circuitry 206 (for example following intermediate or base-band frequency conversion).

In accordance with examples of the invention, the memory device 216 stores, for example, various filtering co-efficients or parameters in the UE 125 to enable filtering to be performed by one or more modules within signal processing function 208. In some examples, the memory device 216 may store filtering parameters of layer 3 filtering module 232 to facilitate layer 3 (radio resource control layer) filtering.

In accordance with examples of the invention, scaling calculation module 236 may generate a scaling factor, which may be used by measurement evaluation module 238 to scale certain parameters when performing measurement evaluation, for example based on a value of a gradient determined by gradient calculation module 234.

In some examples, measurement evaluation module 238 may advantageously utilise two independent input signals, namely a first signal that the measurement evaluation module 238 obtains directly from layer 1 filtering module 230 and layer 3 filtering module 232, and a second signal obtained from an output of either layer 1 filtering module 230 or optionally from additional layer 3 filtering module 232 and routed via gradient calculation module 234 and scaling calculation module 236. In this example, the second signal may represent a scaling factor that has been calculated in scaling calculation module 236, for example based on a value of a gradient calculated in gradient calculation module 234. In this case, in some examples, the scaling factor may be used by measurement evaluation module 238 to scale certain parameters when performing measurement evaluation.

In one example, a reference signal received power (RSRP) may be determined by measurement evaluation module 238, and the gradient value calculated by the gradient calculation module 234 may show that, towards the edge of a macro cell, the slope of the RSRP of the macro cell may be lower than that of a small cell. This may suggest, in some examples, that upon macro cell to small cell handover, a calculated gradient would be higher than upon macro cell to macro cell handover. Further, a gradient curve calculated by gradient calculating module 234 may show high levels of fluctuation. In one example, this fluctuation may imply that scaling may not be applied consistently, for example, at a first moment that the calculated gradient value may exceed a threshold value, resulting in a scaling operation to, say, expedite a handover whereas at a next moment the calculated gradient may be below the threshold value, and may result in scaling not being applied by scaling calculation module 236.

Furthermore, a timer 218 is operably coupled to the controller 214 to control the timing of operations (transmission or reception of time-dependent signals) within the UE 125, particularly with regard to transmitting measurement reports, for example as triggered by measurement evaluation module 238 of the UE 125 and/or processing received signals.

As regards the transmit chain, this essentially includes an input device 220, such as a keypad, coupled in series through transmitter/modulation circuitry 222 and a power amplifier 224 to the antenna 202. The transmitter/modulation circuitry 222 and the power amplifier 224 are operationally responsive to the controller 214, and as such are used in transmitting measurement reports, for example as triggered by measurement evaluation module 238 of the UE 125.

The signal processor function 208 in the transmit chain may be implemented as distinct from the processor in the receive chain. Alternatively, a single processor 208 may be used to implement processing of both transmit and receive signals, as shown in FIG. 2. Clearly, the various components within the UE 125 can be realised in discrete or integrated component form, with an ultimate structure therefore being merely an application-specific or design selection.

Figure 3:
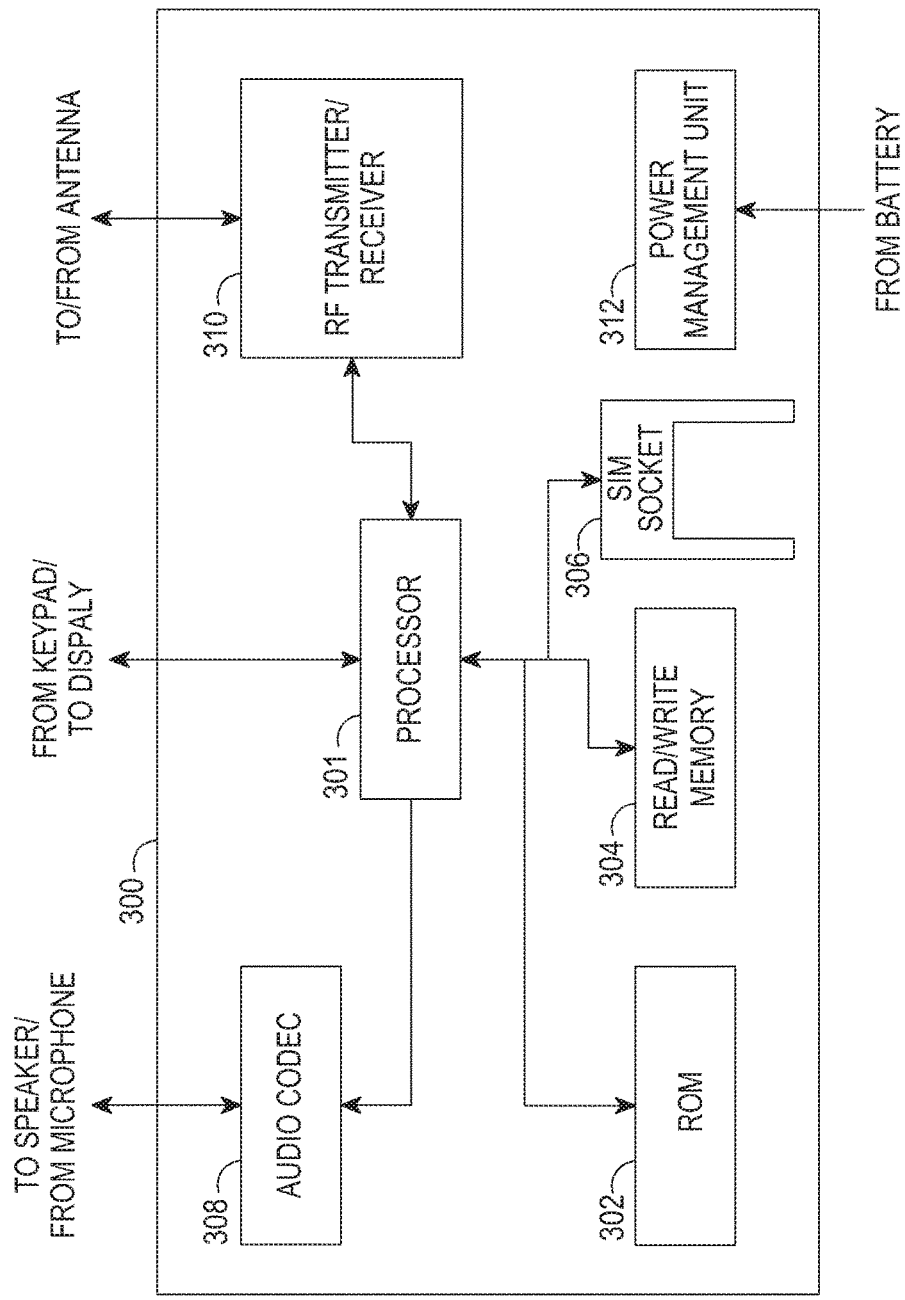
FIG. 3 illustrates an example of some elements of a wireless communication unit adapted in accordance with some embodiments of the invention.

Similarly, FIG. 3 discloses a device for mechanically supporting and electrically connecting electronic components using conductive pathways on a nonconductive substrate, for example, a circuit board 300 of the UE 125 of FIG. 1 and FIG. 2. The circuit board comprises a processor 301 which is configured to perform all of the processing activities normally associated with a UE. In some examples, processor 301 may be operable to perform some or all of the functionality of controller 214 in FIG. 2. To do this, it is connected to a read only memory 302, which stores, permanently, processor executable instructions, and data, consistent with this role. Further, a read/write memory 304 provides a facility for the processor two store further instructions, and data, for use as required. A SIM socket 306 provides a receptacle for receiving a subscriber identity module (SIM).

An audio codec (coder/decoder) 308 provides facilities for interaction between the processor 300 and external speaker and microphone (not shown). The processor 300 itself is able to receive commands from an external keypad (not shown) and to send display data to an external display (not shown). It will be appreciated that, in some arrangements, it may be desirable to provide a separate display driver, and indeed drivers for the other components. For reasons of clarity, such drivers are not described in this embodiment.

An RF transmitter/receiver 310, such as the one illustrated in FIG. 2 provides facilities for interaction between the processor and the antenna 202.

In addition, a power management unit 312 provide power management facilities to the circuit board 300. These facilities might include power saving, early warning of battery discharge, surge protection, regulation and so on. For reasons of clarity, interconnections between the power management unit 312 and other components of the circuit board 300 are omitted from FIG. 3.

By execution of appropriate computer program products stored in either the read-only memory 302 or the read/write memory 304, the processor 300 establishes operation of a protocol stack (400 of FIG. 4) for communication with a base station. This base station may be the macro cell BS 185 or the small BS 150, as illustrated in FIG. 1.

Figure 4:
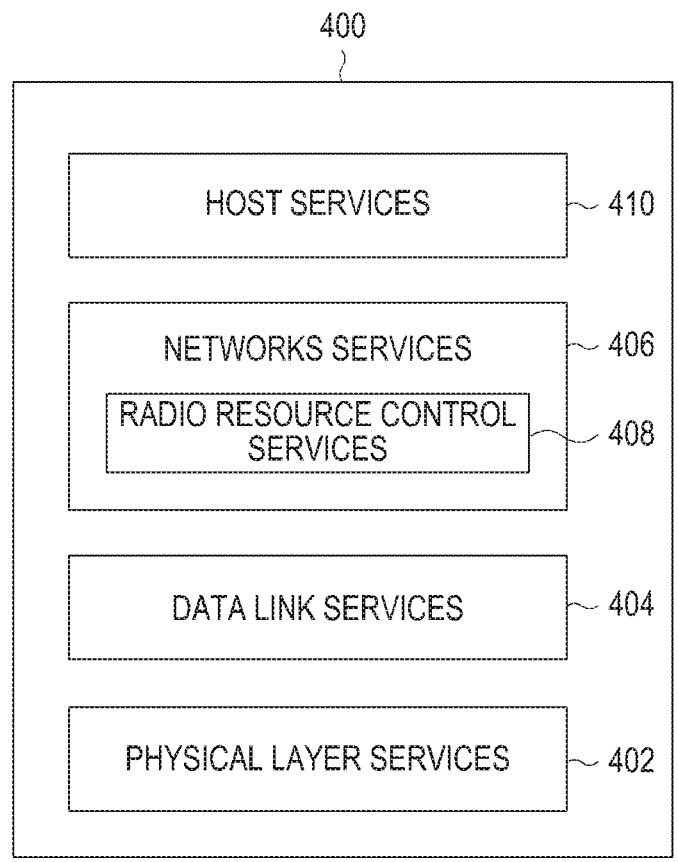
FIG. 4 illustrates an example protocol stack comprising a plurality of services which can be organised conceptually into a number of layers adapted in accordance with some embodiments of the invention.

As shown in FIG. 4, the protocol stack 400 comprises a plurality of services which can be organised conceptually into a number of layers. The reader, familiar with the field of this disclosure, will appreciate that the use of this layered concept does not necessarily reflect the way in which software products may be designed, in order to deliver the facilities required of the UE 125. However, the representation is useful in order to gain a better understanding of the embodiments set forth.

The physical layer services 402 as illustrated really represent the radio connectivity of the UE 125 with other devices. As such, much of the functionality of this layer will be provided by the RF transmitter/receiver 310. In some examples, a portion of the functionality of the RF transmitter/receiver 310 may be provided by software. One example of this is the general class of technologies known as 'software defined radio'. This enables the UE 125 to be made adaptable to changing radio protocols from time to time.

Data link services 404 provide the usual functionality of the data link layer found in most conceptual protocol stack representations.

Network services 406 provide the means for data connections to be established between the UE 125 and another device, with regard to issues such as quality of service. It is therefore responsible for handover from one cell to another in a cellular system. To that end, the network services 406 also provide radio resource control (RRC) services 408, which can be used to establish RRC protocols for use in managing handover. It will be appreciated by the reader that the RRC services layer 408 also provides other facilities, such as broadcast of system information, paging, management of radio connections, establishment of user bearers and management of Quality of Service (QoS), and security.

Finally, a layer of host services 410 is illustrated, representing all layers arising above the network services layer in a protocol stack, such as an operating system, applications, session control and so on.

RRC Layer of UE

Figure 5:
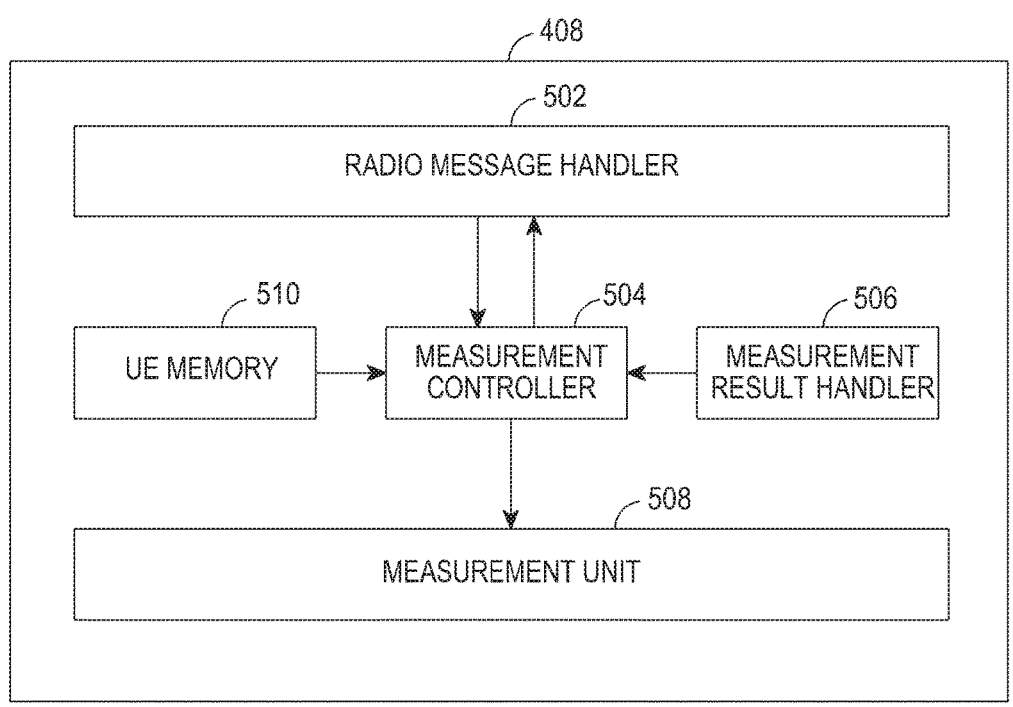
FIG. 5 illustrates an example radio resource control services block adapted in accordance with some embodiments of the invention.

FIG. 5 illustrates the radio resource control services block 408 referred to in connection with FIG. 4. This shows some of the facilities which are required in order to provide an implementation of one of the embodiments described below.

A radio message handler 502 attends to reception and transmission of RRC messages (including the measurement configuration), including handling/setting of the fields contained in the message. In one example embodiment, the radio message handler 502 is configured to support additional measurement configuration extensions (whilst in some examples the setting of the contents of the measurement report may also be affected).

A measurement controller 504 is shown, which controls the execution of the measurements, stores the measurement configuration and measurement results (for example which cells have triggered an event) and handles the input provided by the measurement result handling. In one example embodiment, the measurement controller 504 is configured to support the additional measurement quantity configuration (filtering and scaling) options, as defined by the additional configuration extensions.

A measurement result handler 506 performs some preprocessing of the measurement samples provided by the actual measurement unit for example filtering, analysis of event conditions. In one example embodiment, the measurement result handler 506 is configured to process the samples in a different manner to known processing, e.g. perform different filtering and scaling and evaluate the conditions accordingly.

A measurement unit 508 performs measurements based on the input from measurement control. The measurement samples are provided to the measurement result handler 506. In some examples, measurement controller 504 may be operable to perform measurement evaluation itself or instruct an additional module, for example, measurement result handler 506, to perform measurement evaluation, in a similar fashion to measurement evaluation module 238 in FIG. 2.

A UE memory block 510 is shown, which is a memory resource allocated on the UE 125 for use by the RRC layer 408. It can be implemented in any appropriate memory resource, most likely the Read/Write memory 304.

The structure, architecture and function of base stations within this disclosure reflect the above description of a UE 125, and will not be described in detail here.

Handover

In cellular communication, handover of a UE from one cell to another is a well established technique. The aim, in handover, is to maintain connection with the UE so that sessions being run on the communication channel between the UE and another party are uninterrupted, and meet other specifications such as quality of service.

One collection of standardised technologies representative of this illustrated approach is the E-UTRA technologies specified in the 3GPP standard specifications. In that context, the base station network can be considered exemplified by the E-UTRAN entity specified in the 3GPP specifications.

Figure 6:
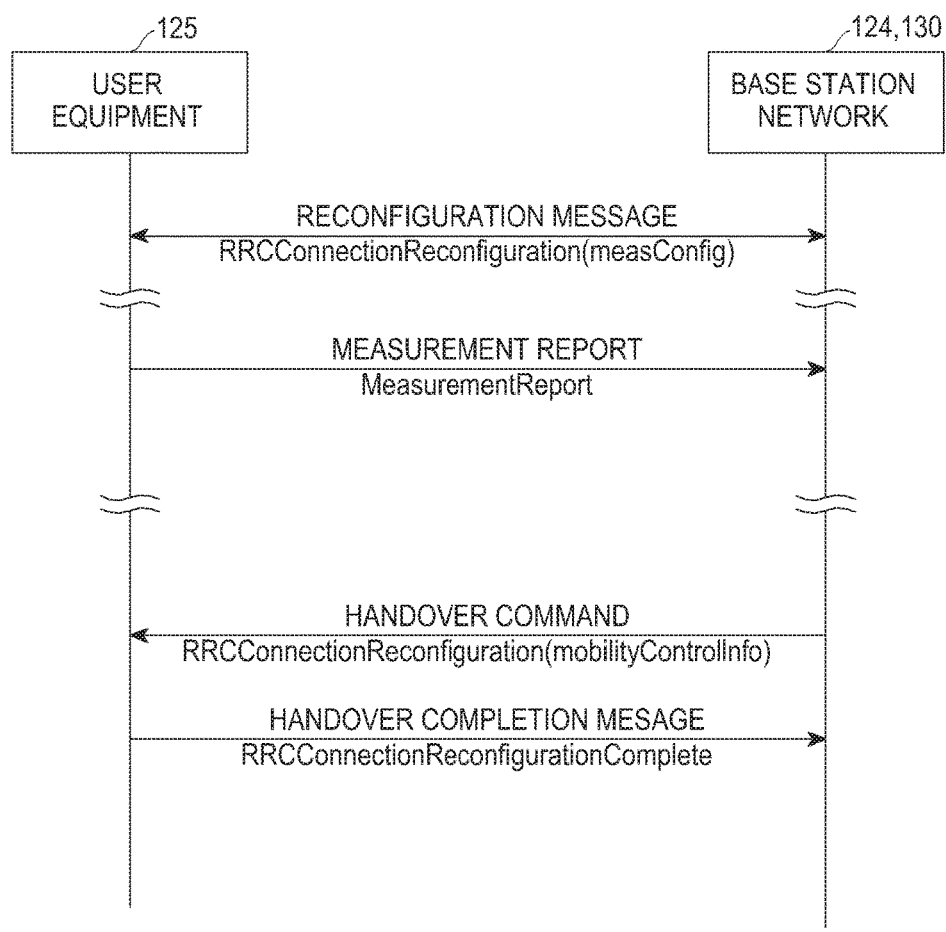
FIG. 6 illustrates an example handover message sequence chart in accordance with some embodiments of the invention.

The handover procedure, as illustrated in FIG. 6, includes the configuration of measurement reporting as well as the actual measurement report. To this end, it involves the following main elements:

1. Reconfiguration Command

The base station network configures the UE to perform measurement reporting. The base station network does this using a reconfiguration procedure. In one approach, this is achieved by sending a message in the RRC protocol layer. This message is, for the purpose of this disclosure, known as the RRCConnectionReconfiguration message. To trigger the UE to commence a measurement procedure, a measurement configuration (measConfig) field is included in the RRCConnectionReconfiguration message. Further, the UE confirms receipt of RRC-ConnectionReconfiguration message by returning an RRCConnectionReconfigurationComplete message.

2. Transmission of a Measurement Report by the UE

If certain conditions are met, the UE sends a MeasurementReport message to the base station network that includes measurement results for the cell(s) in which the UE has serving connectivity, as well as of one or more neighbouring cells, either on the serving frequency or on another frequency.

3. Base Station Network Orders the UE to Connect to Another Cell (Handover)

Handover is ordered by a handover command, sent by the serving eNodeB. The handover command, in one embodiment, comprises a further message in the RRCConnectionReconfiguration format, including a field named here mobilityControlInfo. The mobilityControlInfo includes information as to the cell to which the UE should connect. Further, the source base station may send the RRCConnectionReconfiguration message. The RRCConnectionReconfiguration message may originate from the target base station, which sends it with a HandoverCommand message (see 36.331, 10.2.2) to the source base station. The HandoverCommand message is again included in a Handover Request Acknowledge across a X2 interface. The UE responds to this by establishing connection with the indicated cell.

4. UE Reports Completion of Handover

The UE reports back to the base station network that handover has been completed, in a handover completion message. This is illustrated for consistency with the existing aforementioned Standard, as RRCConnectionReconfigurationComplete, in FIG. 6.

The base stations are themselves networked to each other, so that the UE does not experience communications dropout. Communication between the base stations may be by way of further wireless communications links or by physical connection.

measConfig Field

The measConfig field enables the base station network to specify the measurements to be conducted by the UE. The UE need not know the purpose to which the measurements will be put, at the base station network. It is entirely the responsibility, in this embodiment, of the base station network to determine the measurements to be used, and for what purpose they will be used. In one arrangement, the measConfig field includes a list of measurements, each comprising three main elements and also the quantity configuration. In some examples, the quantity configuration or quantityConfig field may define the layer 3 filtering to be used on each measurement. In one example embodiment the quantity configuration may comprise the filter co-efficient(s) to be used by the L3 filter(s) for measurements and/or gradient values at radio resource control layer.

Figure 7:
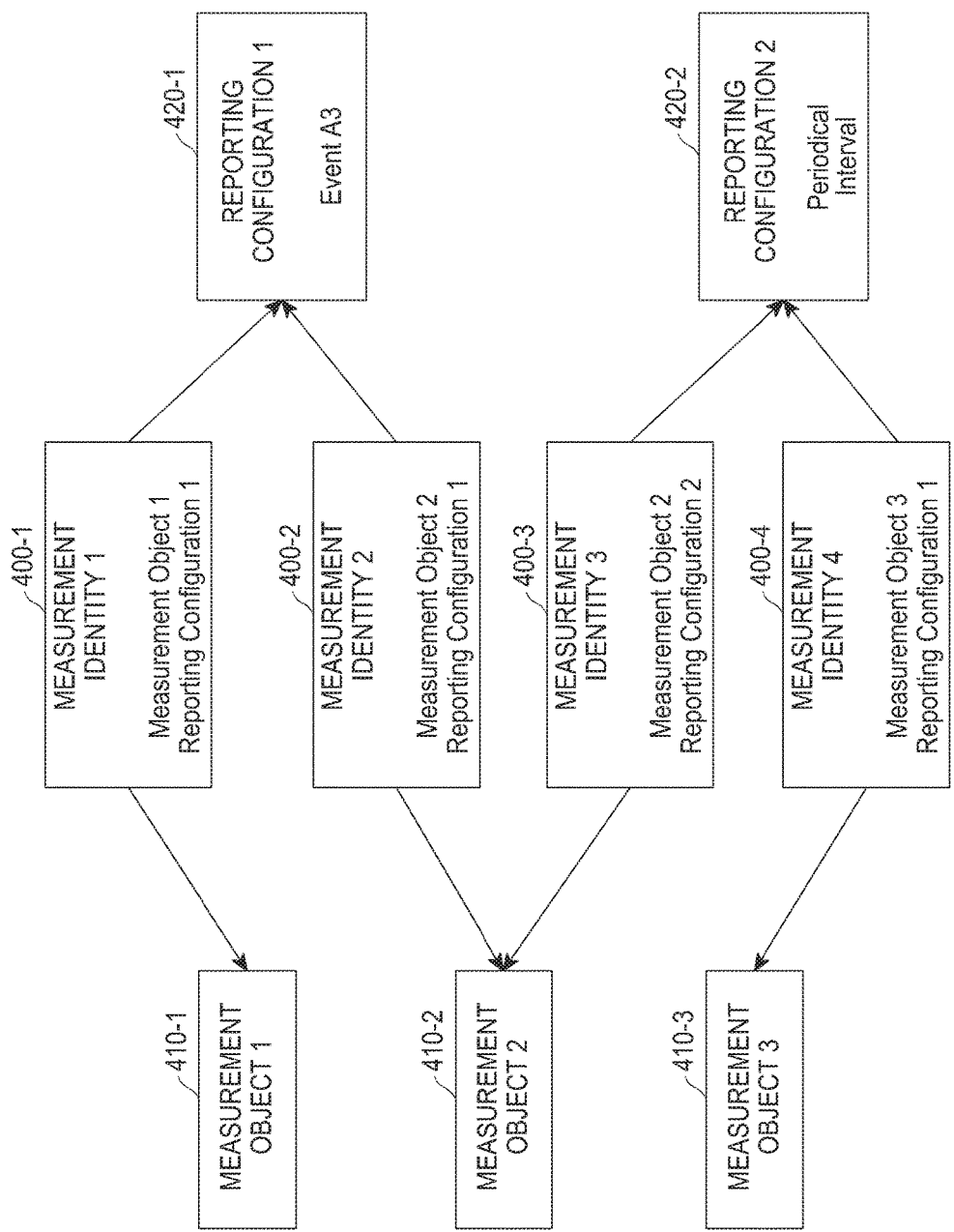
FIG. 7 illustrates examples of measurement objects, measurement identities and reporting thereof for handover messages in accordance with some embodiments of the invention.

An example measConfig field is illustrated in FIG. 7.

1. Measurement Identity

The measurement identity 400-1, 400-2, 400-3, 400-4 identifies a measurement, linking a measurement object and a reporting configuration. Each of the blocks illustrated in FIG. 6 provide relationship information between one particular measurement object and one particular reporting configuration. As shown, a measurement is identified by an measurement identity, and is defined by one object and one reporting configuration.

2. Measurement Object

A measurement object 410-1, 410-2, 410-3 is a data item which specifies a set of cells of a certain radio access technology (RAT) type (for example, all cells on an LTE frequency, a list of cells on a UMTS frequency, a list of GSM cells/frequencies). The measurement object may also include a list of cells for which for configuration parameters are set to a specific value. In LTE there is only one cell specific measurement configuration parameter, namely the cell specific offset.

3. Measurement Reporting Configuration

The measurement reporting configuration specifies the basis on which the UE should trigger a measurement report as well as which information the UE should include in the measurement report.

In one approach, exemplified by reporting configuration 1 (420-1) in FIG. 6, a measurement reporting configuration is event triggered. In this case, a measurement report is triggered when a particular 'event condition' is fulfilled. An example of an event condition which could be used, is where a neighbour cell is found to be 'better' than the cell currently serving the UE. This is denoted by 'event a3' in FIG. 6. This might be determined by monitoring a particular criterion for an offset to exist between the performance criterion of the neighbouring cell against the current cell. An offset might be used to encourage or discourage mobility to a particular cell or frequency.

As represented by reporting configuration 2 (420-2) in FIG. 6, a measurement report could also be triggered at regular intervals. This reporting configuration might specify the period of the reporting cycle, and perhaps the number of times the reporting should be repeated.

The reporting configuration also specifies which measurement quantities should be reported, and the maximum number of cells that may be included in the report. The reader will appreciate that, in the event that the number of cells to be included in the report is to be limited, it is desirable to order the cells to be reported in an order of measurement result, that is with the best cell reported first.

In the E-UTRA context, measurements using event type a3 (Neighbour becomes offset better than PCell) are typically used by E-UTRAN to trigger handover to a neighbouring cell. Therefore, if a measurement of event type a3 is configured, the UE triggers the sending of a measurement report when a neighbouring cell meets the entering condition for at least a duration indicated by field timeToTrigger.

The entering condition may be specified by:

MathFigure 1

$$Mn + Ofn + Ocn - Hys > Mp + Ofp + Ocp + Off \qquad [\text{Math.1}]$$

where:
- Mn is the measurement result of the neighbouring cell, not taking into account any offsets;
- Ofn is the frequency specific offset of the frequency of the neighbour cell (i.e. offsetFreq as defined within measObjectEUTRA corresponding to the frequency of the neighbour cell);
- Ocn is the cell specific offset of the neighbour cell (i.e. cellIndividualOffset as defined within measObjectEUTRA corresponding to the frequency of the neighbour cell), and set to zero if not configured for the neighbour cell;
- Mp is the measurement result of the PCell, not taking into account any offsets;
- Ofp is the frequency specific offset of the primary frequency (i.e. offsetFreq as defined within measObjectEUTRA corresponding to the primary frequency);
- Ocp is the cell specific offset of the PCell (i.e. cellIndividualOffset as defined within measObjectEUTRA corresponding to the primary frequency), and is set to zero if not configured for the PCell;
- Hys is the hysteresis parameter for this event (i.e. hysteresis as defined within reportConfigEUTRA for this event); and
- Off being the offset parameter for this event (i.e. a3-Offset as defined within reportConfigEUTRA for this event).

In summary, for the support of mobility in a HetNet type of deployment the following measurement related configuration parameters are most relevant:
- Time to trigger (TTT, timeToTrigger);
- Offsets (frequency and cell-specific offsets, both of serving and neighbouring, as well as the event specific offset); and
- Hysteresis (Hys)
- Mobility State and Speed Dependent Scaling In the state known as RRC_Connected in LTE, and with equivalents in other known technologies, speed dependent scaling is applied to the timeToTrigger parameter. Speed dependent scaling involves multiplying the configured value by a scaling factor that depends on a UE speed state. Three mobility states are defined in LTE: normal (low), medium and high. For medium and high mobility states, separate scaling factors can be configured (0.25, 0.50, 0.75 or 1).

The UE speed state is determined based on the number of cell changes (handovers) in a particular period, as follows:
- If the number of cell changes during a configurable period (t-Evaluation) exceeds a configurable high threshold (n-CellChangeHigh), the UE moves to the high mobility state
- else if the number of cell changes during a configurable period (t-Evaluation) exceeds a configurable medium threshold (n-CellChangeMedium), the UE moves to the medium mobility state
- else if during a configurable period (t-HystNormal) the above conditions for entering high or medium state are not met, the UE moves to the normal mobility state.

The reader should note that the above conditions impose hysteresis to the transition back to the normal mobility state.

One issue which is identified in the above arrangement is that it is not possible to address all HetNet mobility scenarios with existing configuration parameters. In essence, this problem is exemplified in that, in a radio network employing both macro cell and pico cells on one frequency, it is not possible to configure the UE to report measurements in a manner that is optimal for all types of cell changes. In particular, handover related measurement reports should be triggered relatively quickly in case of mobility to and/or from a pico cell whereas handovers between macro cells may be more appropriately triggered somewhat more slowly.

In this respect it should be noted that applying a lower value for the timeToTrigger parameter will ensure that the UE reports more quickly the identification of a neighbouring cell that is somewhat better than the existing serving cell. However, if the UE is stationary on the border of two cells, assigning a lower value to timeToTrigger may result in more frequent switches between the two cells (i.e. ping-pong). Other potential approaches to providing amelioration of this issue of heterogeneity may suffer from tradeoffs similar to this one.

Examples set out below focus on the case that macro cell and pico cells are deployed on one layer. It will be appreciated that it is already possible to configure different parameters for different frequencies. Some of the examples may also offer advantages, in certain circumstances, for inter-frequency mobility when each frequency has different types of cells (i.e. only macro cell or pico).

A number of embodiments will now be described. While the embodiments are described in the context of the above description of techniques specific to a particular class of radio communication technologies, and to a particular model for considering the organisation of processes into a protocol stack, the reader will understand that the disclosure is not limited thereto.

In this embodiment, an arrangement is described which implements different approaches to handover, depending on the type of handover presented.

It is desirable, in a HetNet type of deployment, to expedite handovers to pico cells without affecting handovers between macro cells.

The following types of handovers can be specified, if two classes of cells can be identified:
1) small cell→macro cell
2) macro cell→small cell
3) small cell→small cell
4) macro cell→macro cell An implementation of this embodiment can provide separate sets of parameter values for all parameters affecting the measurement reporting i.e. timeToTrigger, offsets (frequency, cell and event specific), thresholds, hysteresis and scaling factors. It may however be simpler to define separate sets only for a subset of the parameters, for example the parameters affecting handover performance to the greatest extent.

In a particular implementation, it may be sufficient to impose a requirement that, for handover from one macro cell to another macro cell, handover should be relatively slow (i.e. a relatively long timeToTrigger should be applied) while for all other handover cases (pico cell to macro cell, macro cell to pico cell, pico cell to pico cell) handover should be relatively quick. In one alternative arrangement of this embodiment, therefore, two sets of parameters are defined, one set for mobility reports that should be triggered slowly and one set of parameters for mobility reports that should be triggered relatively quickly. In this case, the UE applies the first set (slow) for measurement reporting involving macro cells only and the second set (quick) for all other cases.

In a particular arrangement of this embodiment, the additional parameter sets are specified at the location where the corresponding parameters are currently defined. Additional offsets are included in the reportConfig.

One particular feature, which can be incorporated into this embodiment, is to apply scaling for any parameter for which speed dependent scaling is defined, in accordance with the principles laid out in the description of some previous embodiments. This can be carried across all sets of parameters, per transition type. Thus, it is not necessary to restate speed dependent parameter scaling in every set, if it is intended to apply speed dependent scaling for a parameter. The UE will infer from the provision of speed dependent scaling in one parameter set that it is to be applied for all transition types.

In another example embodiment, a general characteristic of the radio signals in HetNet types of deployment is that at some cell borders the differences in the measurement of the source compared to that of the candidate cell changes rapidly (such as to and from a pico cell), while at other cell borders the changes occur much more slowly (such as between two macro cells).

This example embodiment employs this effect by apply different sets of parameters for handover entering conditions, depending on the rate of change of the relevant measurement results.

In general terms, therefore, this embodiment concerns a UE which applies different sets of measurement triggering related parameters for different levels of the gradient of the measurement result. That is, if the measurement result changes more than a certain amount in a particular measurement period, this is denoted 'level 1' gradient. The UE then applies the set of parameters defined for this level. Two or more sets of parameters, each representing a certain 'gradient level', may be defined.

As above discussed in relation to the previous embodiment, an implementation of this embodiment can provide separate sets of parameter values, per gradient level, for all parameters affecting the measurement reporting i.e. timeToTrigger, offsets (frequency, cell and event specific), thresholds, hysteresis and scaling factors. It may however be simpler to define separate sets only for a subset of the parameters, for example the parameters affecting handover performance to the greatest extent.

In a particular arrangement of this embodiment, the parameter sets, per gradient level, are specified at the location where the parameters are defined. Additional offsets are included in the reportConfig.

Again, as referred to with reference to the previous embodiment, scaling can be applied for any parameter for which speed dependent scaling is defined, in accordance with the principles laid out in the description of embodiment 1. This can be carried across all sets of parameters, per gradient level. Thus, it is not necessary to restate speed dependent parameter scaling in every set, if it is intended to apply speed dependent scaling for a parameter. The UE will infer from the provision of speed dependent scaling in one parameter set that it is to be applied for all transition types.

Some events are based on the serving cell only, while others are based on comparison of a serving and a neighbouring cell. The gradient can be applied in either or both cases. For events based on a single cell, the gradient level is based on the measurement result of the cell in question. For events based on the comparison of cells, for example a serving cell and a neighbouring cell, the gradient level is based on the difference in the measurement result of the two cells, for example the difference between the serving and the neighbouring cell.

Measurement results are based on physical layer samples that may be taken at an implementation specific rate. To achieve a defined measurement performance, these measurements are filtered both at the physical layer (layer 1) as well as by the radio resource control layer (layer 3). To achieve a defined performance, the gradient either has to be based on the filtered measurements or, when the gradient is based on the unfiltered measurements, separate filtering has to be applied to the measurement gradient. The level that corresponds with a measurement gradient value can either be universally agreed (i.e. specified in technical standards) or be configured by the particular implementation of the base station network. If configuration is used, the base station network would for example indicate that level 1 would apply for values up to Va, level 2 would apply for values up to Vb, etc. As this part of the configuration (i.e. these boundary values) can be shared between measurements using gradient levels, it is appropriate to signal this as part of the measObject or the measConfig.

According to another embodiment, whereas previously described embodiments use measurement gradient as a refinement of mobility state, this embodiment uses measurement gradient as a precursor to the response of a UE to its mobility state.

In some examples, it is envisaged that define different sets of parameters may be defined, e.g. one set for gradient below thresh_1, another set for gradient above thresh_1 and so on.

That is, the behaviour of a UE, in a particular mobility state, depends on the measurement gradient.

More particularly, if the measurement gradient level is 'normal', the UE applies speed scaling normally i.e. depending on UE speed state.

If the measurement gradient level is 'medium', the UE applies the scaling factor for medium or high speed states, depending on the mobility state. That is, the UE applies the scaling factor for a medium speed state if the UE speed state is normal or medium and applies the scaling factor for high speed if the UE speed state is high.

If the measurement gradient is 'high' the UE applies the scaling factor for high speed state regardless of the UE speed state. Table 1 sets this out in summary.

TABLE 1

| Measurement gradient | UE Mobility State | | |
| --- | --- | --- | --- |
| | Normal | Medium | High |
| Normal | Apply normal speed scaling | Apply medium speed scaling | Apply high speed scaling |
| Medium | Apply speed scaling for medium speed state | Apply speed scaling for medium speed state | Apply speed scaling for high speed state |
| High | Apply speed scaling for high speed state | Apply speed scaling for high speed state | Apply speed scaling for high speed state |

In short, therefore, when selecting the scaling factors, the UE applies the maximum of the speed state and the measurement gradient level. For example, it applies 'high' whenever either the UE speed state or the measurement gradient level is determined to be high.

Rather than a fixed rule as set out above and with reference to table 1, the base station network could also specify a minimum scaling factor to apply for each measurement gradient level. This configuration can be re-used by several measurements and hence it could be signalled as part of the measObject or the measConfig.

As per some previous embodiments, some events are based on the serving cell only, while others are based on comparison of a serving and a neighbouring cell. The measurement gradient can be applied in either or both cases. For events based on a single cell, the gradient level is based on the measurement result of the cell in question. For events based on the comparison of cells, for example a serving cell and a neighbouring cell, the gradient level is based on the difference in the measurement result of the two cells, for example the difference between the serving and the neighbouring cell.

Measurement results are based on physical layer samples that may be taken at an implementation specific rate. To achieve a defined measurement performance, these measurements are filtered both at the physical layer (layer 1) as well as by the radio resource control layer (layer 3). To achieve a defined performance, the gradient either has to be based on the filtered measurements or, when the gradient is based on the unfiltered measurements, separate filtering has to be applied to the measurement gradient.

Which level corresponds with a measurement gradient value can either be universally agreed (i.e. specified in technical standards) or be configured by the particular implementation of the base station network. If configuration is used, the base station network would for example indicate that level 1 would apply for values up to Va, level 2 would apply for values up to Vb, etc. As this part of the configuration (i.e. these boundary values) can be shared between measurements using gradient levels, it is appropriate to signal this as part of the measObject or the measConfig.

In a yet further embodiment, in general terms, differs from previously presented arrangements by the introduction of an additional scaling factor, based on the gradient, applied to the parameters described above.

In this embodiment, the scaling factor applied by the UE is the product of the speed dependent scaling factor and the measurement gradient scaling factor. To some extent, this is similar to UE speed state dependent scaling, but where the UE applies an additional scaling factor based on the measurement gradient. The parameter that the UE applies (Pa) is the result of multiplying the speed dependent scaling factor (SFs), the measurement gradient scaling factor (SFg) and the originally base-line parameter (Pb) i.e.:

MathFigure 2

$$Pa=SFs*SFg*Pb \quad\quad [\text{Math.2}]$$

As per some previous embodiments, some events are based on the serving cell only, while others are based on comparison of a serving and a neighbouring cell. The measurement gradient can be applied in either or both cases. For events based on a single cell, the gradient level is based on the measurement result of the cell in question. For events based on the comparison of cells, for example a serving cell and a neighbouring cell, the gradient level is based on the difference in the measurement result of the two cells, for example the difference between the serving and the neighbouring cell.

Measurement results are based on physical layer samples that may be taken at an implementation specific rate. To achieve a defined measurement performance, these measurements are filtered both at the physical layer (layer 1) as well as by the radio resource control layer (layer 3). To achieve a defined performance, the gradient either has to be based on the filtered measurements or, when the gradient is based on the unfiltered measurements, separate filtering has to be applied to the measurement gradient. The level that corresponds with a measurement gradient value can either be universally agreed (i.e. specified in technical standards) or be configured by the particular implementation of the base station network. If configuration is used, the base station network would for example indicate that level 1 would apply for values up to Va, level 2 would apply for values up to Vb, etc. As this part of the configuration (i.e. these boundary values) can be shared between measurements using gradient levels, it is appropriate to signal this as part of the measObject or the measConfig.

The speed dependent scaling factors can be specified in the measurement configuration, as this applies for all measurements using the concerned parameters, as done for the scaling factor for timeToTrigger.

Further detailed examples of this embodiment concern how the base station network signals this configuration to the UE. In particular, the base station network configures the UE to perform measurement gradient reporting within the measurement configuration measConfig.

As will be understood by the reader, some of the preceding discussion as to the nature of, and handling of, the measurement gradient, also apply to this embodiment. In particular, some events are based on the serving cell only, while others are based on comparison of a serving and a neighbouring cell. The gradient can be applied in either or both cases. For events based on a single cell, the gradient level is based on the measurement result of the cell in question. For events based on the comparison of cells, for example a serving cell and a neighbouring cell, the gradient level is based on the difference in the measurement result of the two cells, for example the difference between the serving and the neighbouring cell.

Measurement results are based on physical layer samples that may be taken at an implementation specific rate. To achieve a defined measurement performance, these measurements are filtered both at the physical layer (layer 1) as well as by the radio resource control layer (layer 3). To achieve a defined performance, the gradient either has to be based on the filtered measurements or, when the gradient is based on the unfiltered measurements, separate filtering has to be applied to the measurement gradient.

The level that corresponds with a measurement gradient value can either be universally agreed (i.e. specified in technical standards) or be configured by the particular implementation of the base station network. If configuration is used, the base station network would for example indicate that level 1 would apply for values up to Va, level 2 would apply for values up to Vb, etc. As this part of the configuration (i.e. these boundary values) can be shared between measurements using gradient levels, it is appropriate to signal this as part of the measObject or the measConfig.

The reader will appreciate that the above embodiments are not mutually exclusive. It is entirely possible to envisage, from the above, the combination of the features of any of the above embodiments.

In particular, for example, the measurement gradient can be introduced into the entering and leaving conditions for event a3 while at the same time also introducing measurement gradient dependent scaling for timeToTrigger and cell type specific UE speed state detection.

In the particular context of Evolved Universal Terrestrial Radio Access, as specified by the LTE series of standards, but particularly with reference to 3GPP TS 36 331, it is necessary to envisage a change to existing standard techniques in order to provide implementation of one of the described embodiments.

The reader will see that the 'base station network' referred to above can be implemented by a modified version of the E-UTRAN entity defined in the existing versions of the above standard. Similarly the UE as described herein can be implemented by a UE as specified in the standards, with appropriate extensions and modifications as expressed above.

Most of the proposals included in the previous sections involve an extension of the measurement configuration that E-UTRAN provides to the UE. This affects the RRCConnectionReconfiguration message, in particular the field measConfiguration and/or its subfields. Table 2 sets out to show how the embodiments can be implemented, in the context of extending the existing accepted standard implementations of Radio Resource Control.

TABLE 2

| Additional configuration | Location | Notes |
|---|---|---|
| Scaling factors for additional parameters for example offset | measConfig | |
| Measurement parameters for specific cell change types | Same location as where the parameter is currently specified i.e. mostly within reportConfig | Existing parameters can be used for macro cell to macro cell changes |
| Measurement parameters for different levels of measurement gradient | Same location as where the parameter is currently specified i.e. mostly within reportConfig | Existing parameters can be used for slow/macro cell to macro cell changes |
| Measurement gradient levels | measObject or measConfig | Same for all measurements on the frequency |
| Measurement gradient factors (serving and/or neighbouring) | reportConfig | |
| E-UTRAN could configure the minimum scaling factor to apply for each cell change type | measObject or measConfig | Same for all measurements on the frequency |
| Measurement gradient levels, see 3 | measObject or measConfig | |
| E-UTRAN could configure the minimum scaling factor to apply for each measurement gradient level | measObject or measConfig | Same for all measurements on the frequency |
| Measurement gradient levels, see 3 | measObject or measConfig | |
| Additional scaling factors (based on measurement gradient level) | measConfig | Currently scaling factors are specified in measConfig |
| PCI range of pico cells, see 2 | measObject | Applicable for the concerned frequency |
| Additional scaling factors (based on mobility scenario) | measConfig | Currently scaling factors are specified in measConfig |
| Measurement gradient report request | reportConfig | Probably only relevant for some of the measurements |
| Layer 3 filter co-efficient for measurement and/or gradient | quantityConfig | Currently layer 3 filter coefficient for measurements is specified in quantityConfig |

Only one of the above embodiments also affects the contents of the MeasurementReport message that the UE sends to E-UTRAN, as set out in table 3:

TABLE 3

| Additional configuration | Location | Notes |
|---|---|---|
| Measurement gradient | MeasurementReport (measResultServCell and MeasResultEUTRA within measResultNeighCells) | For all cells for which measurement results are provided |

As will be appreciated by the reader, implementation of an embodiment such as related above will impact on the design of the measurement related blocks of the RRC layer 408 of the UE 125. For instance:

The radio message handler 502 has to support the described measurement configuration extensions and include the required information in the measurement report;

The measurement controller 504 has to support the described measurement options, some of which are based on the described configuration options;

The measurement result handler 506 has to process the samples in a manner commensurate with the above detailed description of the embodiments, for example in compiling the gradient and in the analysis of further conditions.

It is not expected that any requirements are imposed on the measurement unit 508 by the embodiments described herein, but the present disclosure does not preclude modifications thereto if appropriate in certain circumstances.

To provide the reader with a further understanding of a manner in which the presently described embodiments can be put into practice, the following comprises a description of features, some of which are common to certain pluralities of the above embodiments. Whereas the following technical features are presented using the nomenclature used in the LTE series of standards, which will no doubt be familiar to the reader, this is not to be taken as an implicit limitation of the disclosure to that particular radio technology.

The UE implemented in accordance with any one of the above referenced embodiments will need to determine the mobility scenario (small cell to macro cell, macro cell to small cell, small cell to small cell and macro cell to macro cell). This will arise, for example, when the UE needs to determine which, of the sets of measurement reporting parameters that are configured for the different mobility scenarios, applies, or when the UE is configured to select the scaling factor based on both the UE mobility state and the mobility scenario. In such a case, in the context of the LTE technology referenced above:

E-UTRAN indicates which physical cell identities (PCIs) are used by small cells within the measObject.

The UE considers cells that are neither within the range reserved for pico cells, nor within the range reserved for femto cells (if the UE has this information that is indicated by field csg-PhysCellIdRange within SIB4, for the concerned frequency), to be macro cells.

In some embodiments, the UE may be required to determine the measurement gradient level. This may arise when:

There is a need to determine which, of the sets of measurement reporting parameters that are configured for the different measurement gradient levels, applies;

The scaling factor must be selected based on both the UE mobility state and the measurement gradient level; or The specific scaling factor for a particular measurement gradient level must be determined.

In this case:

E-UTRAN indicates which upper value applies for each measurement gradient level, either within the reportConfig or within the measConfig The UE calculates the measurement gradient of a measurement result for a particular cell as follows:
the UE applies the (filtered) measurement results as used for evaluating if event triggering conditions are met
the UE subtracts the previous result from the current result and divides the result by the time interval that elapsed between the previous and current measurement result became available A large number of parameters can affect measurement reporting. Some of these parameters are event specific, for example timeToTrigger, (event specific) offsets, thresholds and hysteresis. Other such parameters are common to all measurements (for example UE speed state parameters, scaling factors and quantityConfig) or common to all measurements on a frequency or cell (namely frequency and cell specific offsets).

timeToTrigger and offset could be the two most critical parameters when it comes to the timely triggering of a measurement report upon mobility to/from a pico cell. If this is the case, it would be desirable to apply different values for these parameters depending on the mobility scenario, or depending on the measurement gradient level.

For example, one set of values could be used for cases where the measurement report should be triggered relatively quickly and another set for cases in which the triggering of the report should be somewhat slower. An example of two of such sets for these two parameters is provided in table 4 below.

TABLE 4

| Parameter | Set 1 (slow) | Set 2 (fast) |
| --- | --- | --- |
| timeToTrigger | 256 ms | 64 ms |
| offset | 6 | 0 |

In one example, when two or more parameter sets are defined, the UE handles measurement reporting parameters that are not included in these sets in the normal manner (e.g. for these there may be only one value). The UE handles the measurement reporting parameters that are included in these sets, by determining, either based on the mobility scenario or based on the measurement gradient level, which of the sets applies when evaluating measurements of a serving cell and/or of a serving and neighbouring cell pair.

For some example embodiments, the UE is configured to select the speed state factor based on both UE speed state and either mobility scenario or measurement gradient level, as the case may be.

In this case, in some examples, the following may apply:

E-UTRAN indicates the minimum scaling factor that applies for each cell change type/measurement gradient level either as part of the measObject or the measConfig. As noted above, it is possible that the minimum value may not be configurable by E-UTRAN but is instead pre-set, such as by agreement in a technical standard;

The UE determines the set of parameters (Ss) that applies according to UE speed state (i.e. normal, medium, high);

The UE determines the minimum set (i.e. normal, medium, high) (Sm) applicable for either the cell change type or the measurement gradient level, depending on the embodiment. This either corresponds with the value configured by E-UTRAN or the standard-specified value;

The UE applies the set corresponding with the maximum of Ss and Sm for example if Ss=high and Sm=medium, the UE applies the set defined for 'high'.

In some other example embodiments, the UE selects the speed state factor based on both UE speed state and either mobility scenario or measurement gradient level. In this case, the following applies:

E-UTRAN indicates the scaling factors that apply for each measurement gradient level as part of the measConfig;

The UE determines the measurement gradient level (as set out in the description of the embodiments above);

The UE determines the scaling factor that applies for the concerned measurement gradient level i.e. as configured by E-UTRAN; and For each parameter that is scaled, the UE applies the following:

The value of the parameter that the UE applies (Pa) is the result of multiplying the speed dependent scaling factor (SFs), the measurement gradient scaling factor (SFg) and the original base-line parameter (Pb) i.e.

MathFigure 3

$$Pa = SFs * SFg * Pb \qquad [\text{Math.3}]$$

While certain embodiments have been described, these embodiments have been presented by way of example only, and are not intended to limit the scope of the protection sought in this application. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope of the concept(s) herein described.

Figure 8:
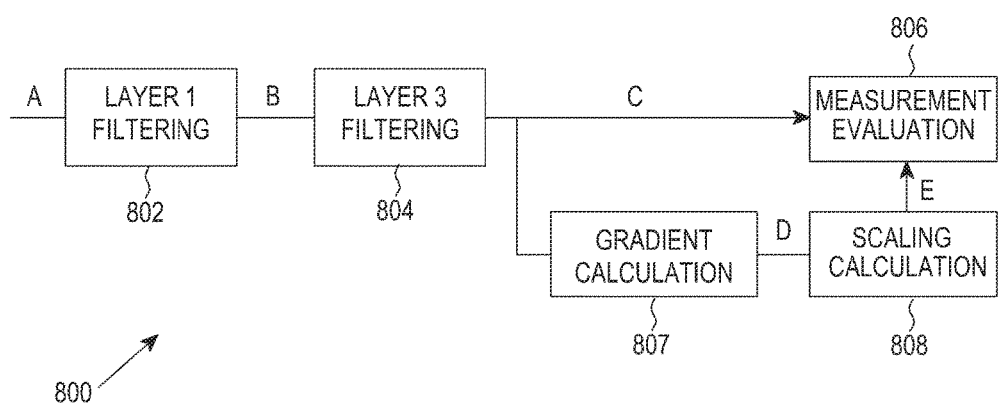
FIGS. 8-12 illustrate various examples of data filtering employed by a terminal device in accordance with some example embodiments of the invention.

Referring to FIG. 8, an example block diagram 800 is illustrated showing an example of implementing filtering and scaling when using a gradient calculation. In this example, a UE, for example UE 125, may initially perform layer 1 filtering, at the physical layer of the received signal, utilising layer 1 filtering module 802. In this example, UE 125 may further and subsequently employ layer 3 filtering module 804 to perform radio resource control layer filtering. In this example, measurement evaluation is performed by measurement evaluation module 806, which evaluates if a measurement report should be triggered.

In this example, measurement evaluation module 806 advantageously utilises two independent input signals, namely signal 'C' obtained directly from layer 3 filtering module 804 and signal 'E' is obtained from an output of layer 3 filtering module 804 and routed via gradient calculating module 807 and scaling calculation module 808. In this example, signal 'C' is thus the resultant input signal that has passed through filtering modules 802 and 804. In this example, signal 'E' may represent the scaling factor that has been calculated in scaling calculation module 808, for example based on a value of the gradient. In this case, the scaling factor may be used by measurement evaluation module 806 to scale certain parameters when performing measurement evaluation.

In this example, the reference signal received power (RSRP) determined by measurement evaluation module 806 may show that, towards the edge of the macro cell, the slope of the RSRP of the macro cell may be lower than that of the small cell. This may suggest, in some examples, that upon macro cell to small cell handover, the gradient would be higher than upon macro cell to macro cell handover. Further, the gradient curve calculated by gradient calculating module 807 may show high levels of fluctuation. This fluctuation may imply that scaling may not be applied consistently, for example, at a first moment the calculated gradient value may exceed a threshold value, resulting in scaling to expedite a handover whereas at the next moment the calculated gradient is below the threshold, resulting in scaling not being applied.

The sudden change of scaling may have the effects of:—
Scaling dip (to address/mitigate the herein before problem(s) via use of a mechanism to ensure consistent scaling results):
  TTT: a temporary increase of TTT may have no real effect; and
  Offset: the entry condition may not be met anymore, which may mean that TTT is reset (which is an undesirable event).
Peak
  TTT: a temporary reduction of TTT may result in a HO being triggered accidentally, which would likely result in undesirable HO ping pong;
  Offset: temporarily meeting entry condition does not harm the performance (due to TTT); and
  When using the second threshold (to avoid HOs that will result in a short ToS), a sudden peak may temporarily stop HO. This may involve a reset of TTT (which may again be undesirable).

In one example, scaling to expedite handover may be performed in the handover region, and advantageously sufficiently well in advance (considering there is a TTT). In some examples, such expedited HO may ensure that scaling is performed consistently in this region.

The inventors have recognised and appreciated that an increase in layer 3 filtering within layer 3 filtering module 804 may cause RSRP curves to lag, thereby resulting in a delayed triggering of a measurement report from measurement evaluation module 806 and, therefore, a delay in handover. Therefore, in some examples, rather than increasing the amount of layer 3 filtering at layer 3 filtering module 804, a separate and additional layer 3 filtering module may be implemented, as illustrated in FIG. 9.

Figure 9:
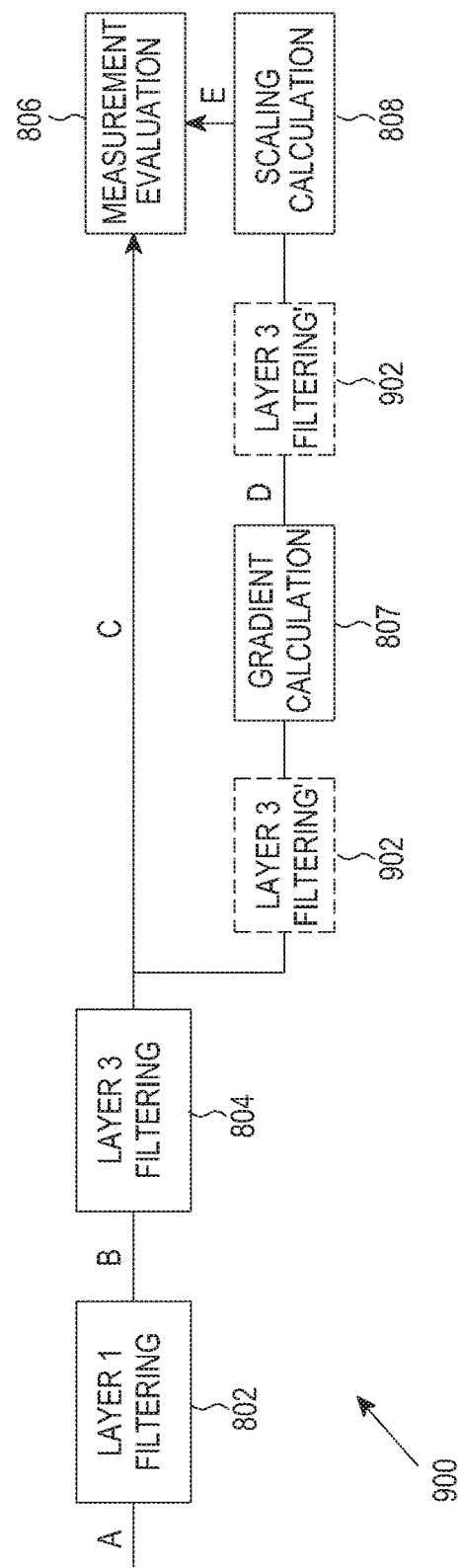

Referring to FIG. 9, a further example block diagram 900 is illustrated showing an example of implementing filtering and scaling when using a gradient calculation. In this example, a UE, for example UE 125, may initially perform layer 1 filtering, at the physical layer of the received signal, utilising layer 1 filtering module 802. In this example, UE 125 may further and subsequently employ layer 3 filtering module 804 to perform radio resource control layer filtering. In this example, measurement evaluation is again performed by measurement evaluation module 806, which evaluates if a measurement report should be triggered. In this example, measurement evaluation module 806 advantageously utilises two independent input signals, namely signal 'C' obtained directly from layer 3 filtering module 804 and signal 'E' is obtained from an output of layer 3 filtering module 804 and routed via gradient calculating module 807, additional layer 3 filtering module 902 and scaling calculation module 808. In this example and as illustrated in FIG. 9, additional layer 3 filtering module 902 may be implemented either before gradient calculation module 807 and/or after gradient calculation module 807. In this example, if additional layer 3 filtering module 902 is implemented before gradient calculation module 807, the output of this additional filtering module should only be used as an input to the gradient calculation module 807, and not for normal measurement evaluation.

Figure 10:
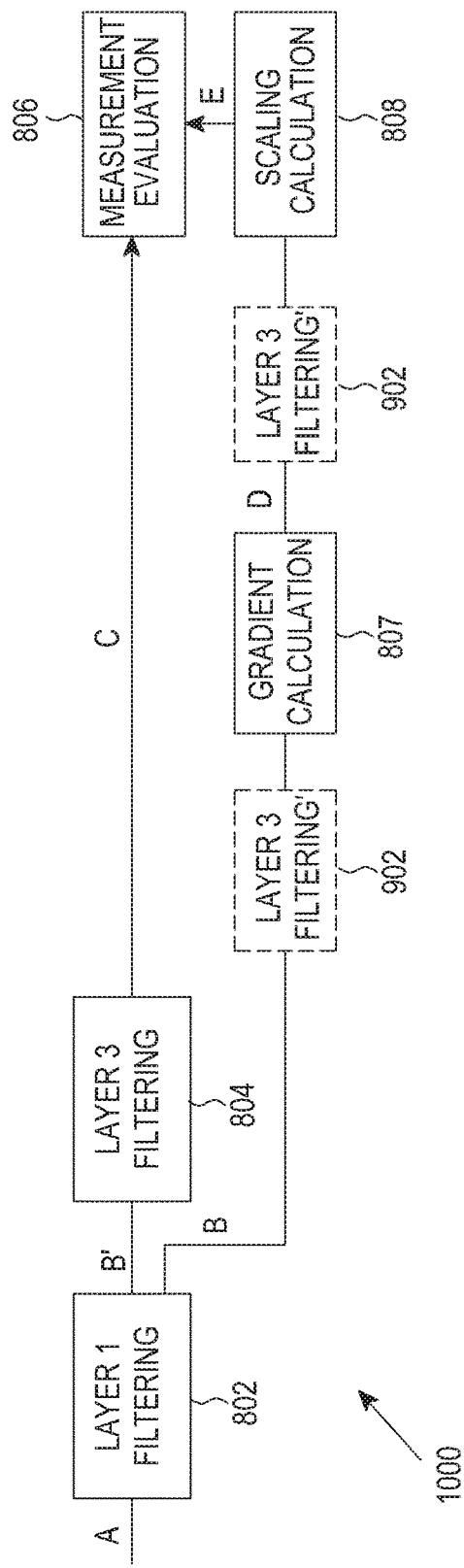

Referring to FIG. 10, a further example block diagram 1000 is illustrated showing an example of implementing filtering and scaling when using a gradient calculation. In this example, a UE, for example UE 125, may initially perform layer 1 filtering, at the physical layer of the received signal, utilising layer 1 filtering module 802. In this example, UE 125 may further and subsequently employ layer 3 filtering module 804 to perform radio resource control layer filtering, as shown via output B'. In this example, measurement evaluation is again performed by measurement evaluation module 806, which evaluates whether a measurement report should be triggered. In this example, measurement evaluation module 806 advantageously utilises two independent input signals, namely signal 'C' obtained directly from layer 3 filtering module 804 and signal 'E', which utilises a second alternative output 'B' from layer 1 filtering module 802. This second alternative output 'B' is routed via gradient calculating module 807, optional additional layer 3 filtering module 902 and scaling calculation module 808. In this example, additional layer 3 filtering module 902 may also and optionally be placed before gradient calculation module 807 and/or after gradient calculation module 807. In this example, the signal 'B' carries the normal/typical layer 1 filtering in which layer 1 filtering module 802 may provide a result to additional layer 3 filtering module 902. In one example, this occurs every 200 ms, which may for example be based on five previous samples each of which may be 40 ms apart. Further, signal B' from layer 1 filtering module 802 concerns an alternative filtering regime that may provide an updated value every 40 ms, for example. This updated value may still be an average over the last five samples, and, therefore, may utilise a sliding window regime, as illustrated at point 1326 in FIG. 13.

Figure 11:
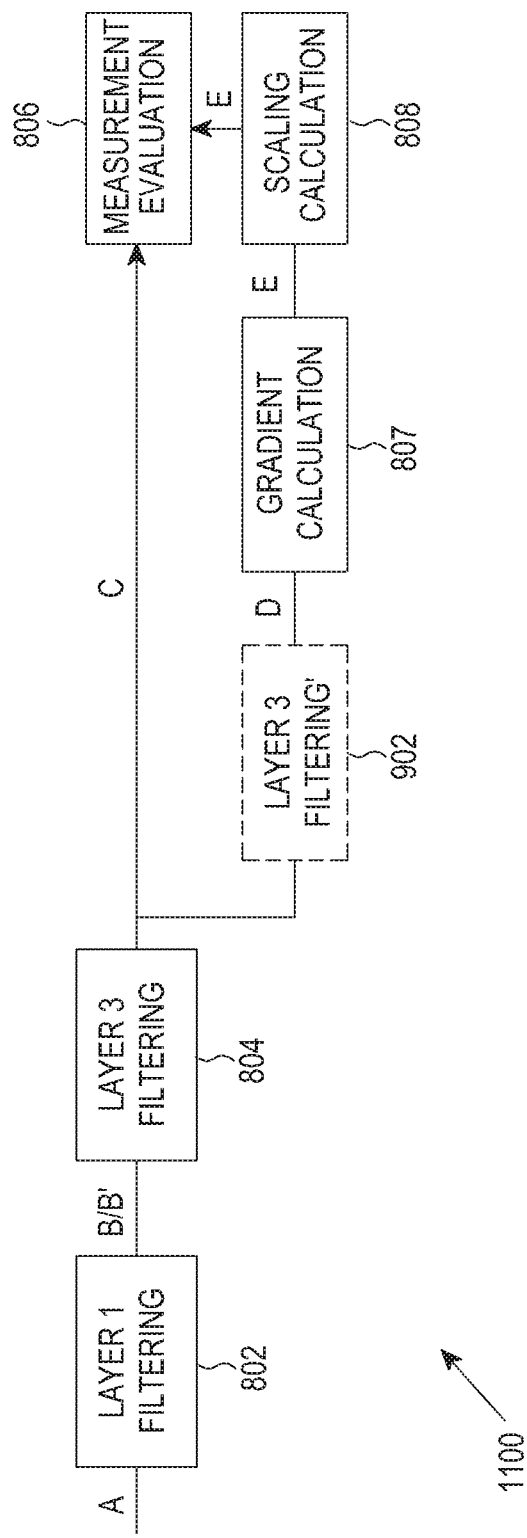
Figure 12:
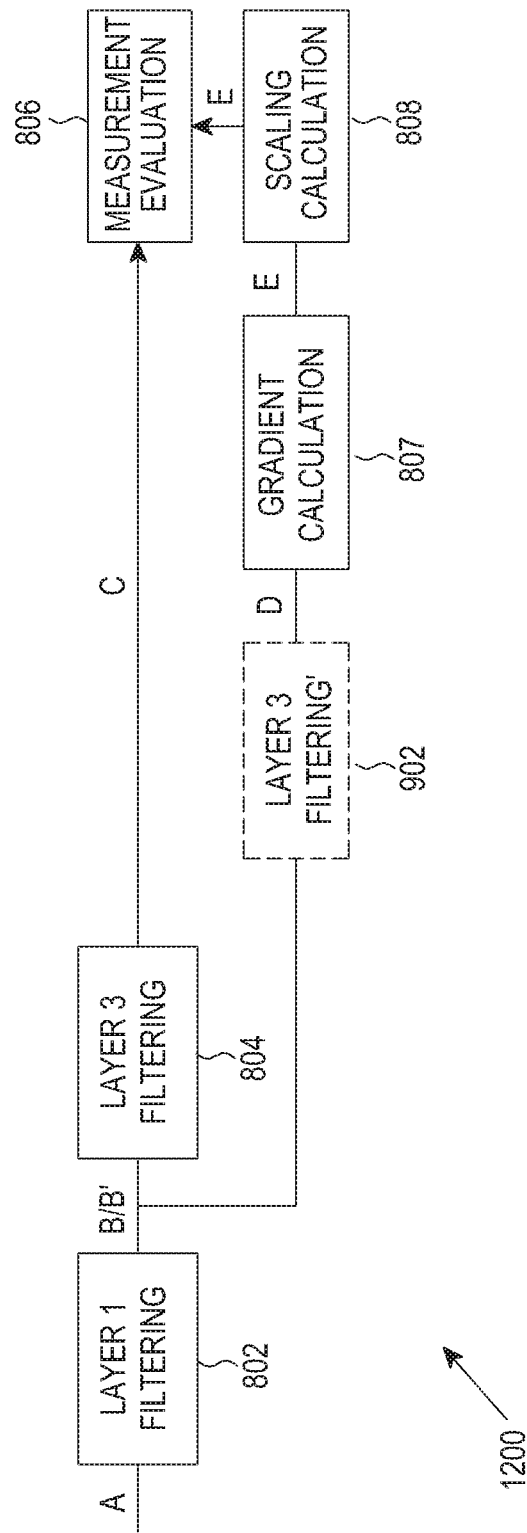

Referring to FIG. 11 and FIG. 12 example alternative embodiments utilising a ratio based gradient scaling embodiment above are shown.

Referring to both FIG. 11 and FIG. 12 and utilising similar topologies to the previous diagrams, scaling is again performed in these examples by scaling calculation module 808 is only utilised if at least a certain ratio, say B/B' of the preceding gradient values exceeds a threshold, for example, as follows:—

Apply scaling to expedite HO only if 'n' out of the last 'm' values are above thresh_1;

Apply scaling to avoid HO only if 'n' out of the last 'm' values are above thresh_2.

where, for example, the following triggers may be employed:

G<Thresh1: no scaling (normal)

Thresh1≤G<Thresh2: scale (expedite HO)

G≥Thresh2: scale (avoid HO)

Therefore, when utilising 'n' out of 'm' based scaling, where 'n/m' is an entry ratio and 'o/m' is a leaving ratio, as described below, little or no layer 3 filtering may be required before or after the gradient calculation in gradient calculation module 807.

In this example, it may be assumed that ratio based scaling could be applied in a sliding window fashion. For example, if a gradient value is determined every 200 ms, then every 200 ms the UE may estimate, based on the last 'm' gradient values, (i.e. produced over the m×200 ms period) whether or not scaling should be performed. However, in other examples, other realisations such as that once every m×200 ms a new scaling value is determined, should not be precluded by the abovementioned example. In this latter case the scaling factor may well remain unchanged for larger periods of time.

Here:

In some examples, a variant may be defined utilising hysteresis (and hence may be conservative to the current state) that defines a different ratio for entering and leaving a state. In this example, hysteresis may be defined when using gradient based scaling by defining a different ratio for entering and leaving a state. For example, a different ratio may be used when in a no scaling state, and moving to a scaling state to expedite HO state if 'n' out of the last 'm' values are above thresh_1. Another example may be when in scaling to expedite HO state, moving back to a no scaling state if 'o' out of the last 'm' values are below thresh_1. Thus, in these examples, the eNB may configure, 'n/m' as an entry ratio and/or 'o/m' as a leaving ratio.

Although in some examples, three states have been employed (e.g. no scaling, scaling to expedite handover and scaling to avoid handover), in other examples, more or less states may be employed.

In some examples, it may be determined that filtering mainly reduces the amplitude of gradient peaks and troughs (dips), whilst the number of peaks and dips may not change significantly. In some cases, the impact of peaks and dips could be reduced by performing scaling only if a certain ratio of gradient values is above a threshold. Therefore, when utilising n out of m based scaling, where n/m is an entry ratio and o/m is a leaving ratio, as described below, little or no layer 3 filtering may be required before or after the gradient calculation in gradient calculation module 807. In FIG. 10, the additional layer 3 filtering module 902 applies filter co-efficient e.g. a kg for gradient specific filtering, which may be different for the normal filter coefficient k applied by the layer 3 filtering module 804.

In some examples, it may be advantageous to utilise both gradient specific filtering and ratio based gradient scaling. For example, referring back to one possible implementation of FIG. 10, gradient specific filtering may be utilised in combination with ratio based gradient scaling.

In some examples, it may not be advantageous to utilise previously determined or received values. Examples, include but are not limited to, change of cell (handover, re-establishment), passing the centre of the cell (i.e. changing from entering to leaving the cell, resulting in a change in sign of the gradient). In such cases, it may be beneficial to introduce special handling, for example, to start from fresh rather than by considering previous values. In a particular example, after handover the sign of the gradient value changes. Thus, when in the ratio based scaling, gradient values from before handover are used, this implies that it may take longer until the scaling factor appropriate for after handover is determined.

In some examples, and referring back to FIG. 6, it may be assumed that the standard may not support two options for layer 3 filtering of the gradient, for example, the layer 3 filtering may be placed either before or after gradient calculation. Therefore, it may be assumed that there is no need for a configuration parameter for this. Further, it may be assumed that current standards may leave it up to UE implementation whether normal or alternative layer 1 filtering is used for the gradient. Therefore, it may be assumed that there is no need for a configuration parameter for this.

In some examples, the introduction of gradient specific layer 3 filtering requires the introduction of a new filtering coefficient e.g. a kg.

In some examples, different kg values may be configured for different measurements. However, in other examples, different kg values may not be configured for different measurements. In some examples, this parameter may be specified as part of a quantity configuration (in a similar manner to the existing filtering coefficient).

In some examples, it may be desirable to use the layer 3 filtering for the gradient only for a subset of the measurements configured for a particular frequency. In some examples, an on/off flag may be introduced within the configuration of each individual measurement. In some examples, two on/off flags may be combined e.g. to cover both Layer 3 filtering for the gradient and the ratio based gradient scaling. In some examples, this may be specified as part of the reporting configuration. In some examples, it may be specified with the measurement identity.

In some examples, an introduction of ratio based gradient scaling may require the introduction of new parameters. It is expected that there is no real need to support the configuration of different parameter values for different measurements (although this is not precluded). In some examples, these parameter may be specified as part of the quantity configuration (alike the Layer 3 filtering coefficient for the gradient).

In some examples, there may be no need to specify a different set of parameters for each state. In some examples, the quantity configuration may include a set of parameters for the ratio based gradient scaling, e.g. 'n', 'm' and optionally a parameter 'o', wherein, as discussed above, 'n'/'m' may be an entry ratio and 'o'/'m' may be a leaving ratio. In some examples, these values may be numbers that the eNodeB may configure.

In some cases, as identified in Table 5 below, the reconfiguration message in FIG. 6 may further comprise a quantifyconfig parameter. In addition, table 5 provides some further details regarding the changes to the RRCConnectionReconfiguration message:

TABLE 5

| Item | Additional configuration | Location | Notes |
|---|---|---|---|
| 1 | Gradient specific layer 3 filtering coefficient i.e. a $k_g$ | quantityConfig within measConfig | |
| 2 | On/off flag indicating whether gradient specific filtering should be used for a particular measurement | reportConfig within measConfig | |
| 3 | Gradient specific scaling parameters i.e. a set of m, n and optionally o values | quantityConfig within measConfig | Possibly one set per scaling state |
| 4 | On/off flag indicating whether gradient specific filtering should be used for a particular measurement | reportConfig within measConfig | Might be combined with 2 i.e. one parameter covering both |

In this case, the UE may be configured (1) with a measurement configuration including parameters for the Layer 3 filtering for the gradient and/or for ratio based gradient scaling. When the triggers for measurement reporting are met (2) for a gradient based measurement, the UE sends a Measurement Report message. The message may include the gradient value. It should be noted that the actual value (4) of the gradient reported by the UE may be affected by embodiments of the invention. Further, E-UTRAN may initiate the handover procedure (in the normal fashion (3)).

The following table 6 illustrates how the contents of the Measurement Report message may be affected.

TABLE 6

| Item | Additional information | Location | Notes |
|---|---|---|---|
| 1 | Measurement gradient information | | For all cells for which measurement results are provided |

To summarise, aspects of the invention may provide a means to smooth the gradient, which may be required for gradient based scaling to work effectively.

The introduction of gradient specific Layer 3 filtering may have the advantage that it may avoid a delay associated with a need for triggering of measurement report (and consequently handover), which would be caused by lagging behind of the RSRP curves when additional filtering would be introduced.

The introduction of using a different Layer 1 filtering output for the gradient may have the advantage that it may reduce the need for Layer 3 filtering for the gradient based scaling. It should be noted that B may be utilised for gradient calculations, and B' for measurement evaluation. The ratio based gradient scaling may have the advantage that it may be very effective in obtaining consistent scaling (i.e. without temporary dips and peaks). In addition, the use of hysteresis can make the scaling even more consistent (even less dips and peaks). Furthermore, it may require less filtering, thereby extending the range in which scaling is applied (i.e. ensuring that scaling is applied sufficiently well in advance of handover).

The reset upon specific events may have the advantage that it may avoid lagging behind of the gradient based scaling caused by previous results that are known to delay the scaling to reach the new stable value.

Figure 13:
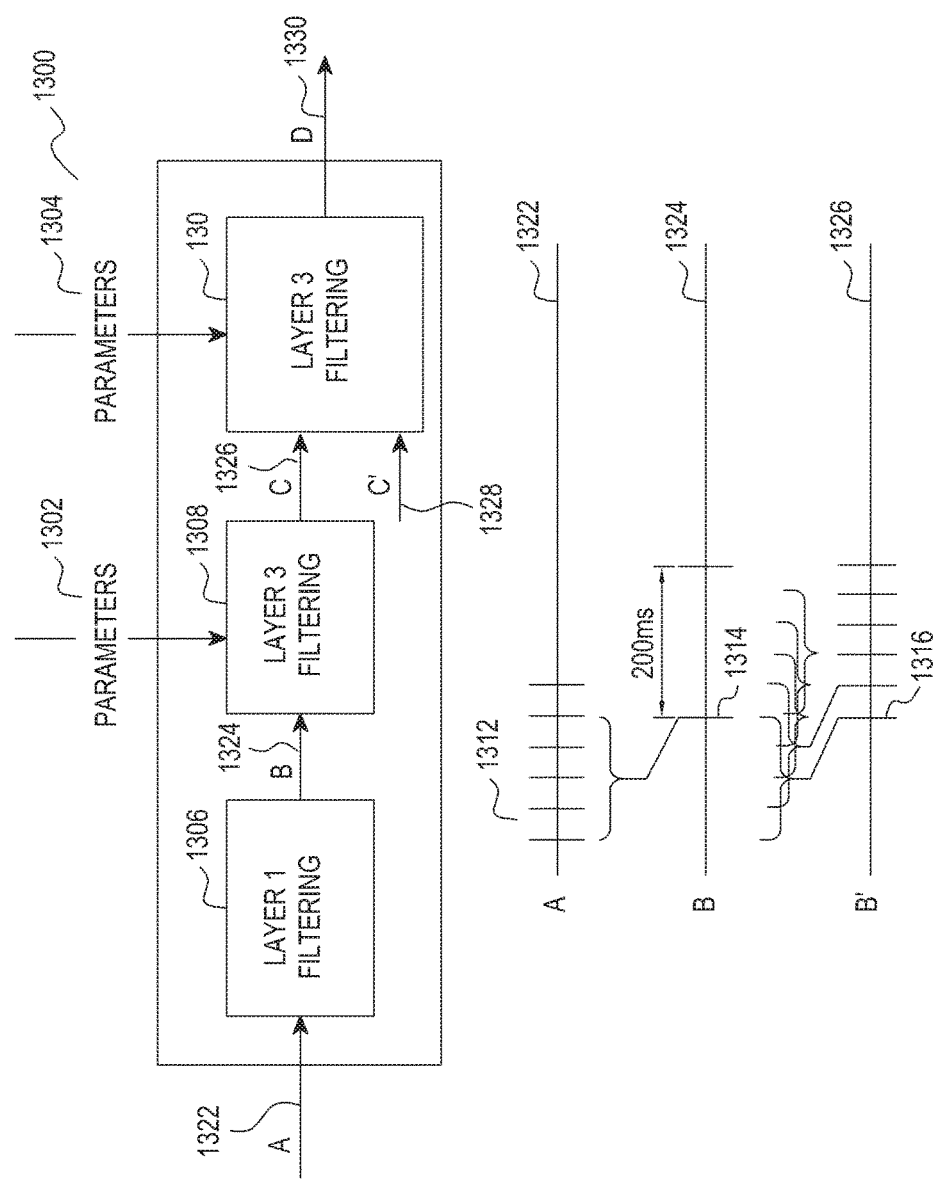
FIG. 13 illustrates a further example of data filtering employed by a terminal device in accordance with some example embodiments of the invention.

Referring now to FIG. 13, a further example of data filtering 1300 employed by a terminal device in accordance with some example embodiments of the invention is illustrated. In this example, there is illustrated normal (B) 1324 and alternative (B') 1326 layer 1 filtering approaches. FIG. 13 comprises, at A, a plurality of L1 samples 1312 that are 40 ms apart. In this case, B concerns normal/typical layer 1 filtering in which layer 1 filtering module 802, for example, may provide a result 1314 every 200 ms based on at least 5 previous L1 samples 1312. In the case of B', an alternative layer 1 filtering (referred to as a sliding window regime) may be utilised, wherein filtering module 802, for example, may provide an updated value every 40 ms 1316. In some examples, this updated value may still be based on an average over the last 5 L1 samples 1312. In other examples, more or less than 5 samples may be utilised to provide result 1314 and 1316.

In one example of the invention, a result of the gradient calculation stage, from gradient calculation module 807 for example, may be one of three possible states, for example: a 'normal' state, an 'expedite HO' state and an 'avoid HO' state. In other examples, there may be more or less than three possible states that result from the gradient calculation stage. In some further examples, the normal, expedite HO and avoid HO states may be utilised to scale TimeToTrigger and/or offsets such as the a3 offset.

In other examples of the invention, the ratio based gradient parameters may not result in a scaling factor, but in a ratio based gradient parameter set, or in a gradient based state. In the latter example, the gradient based state may have a specific set of parameters associated with it.

Thus, in some examples, the aforementioned concepts may assist in providing more robustness to HetNet mobility. For example, event triggering in accordance with one or more of the aforementioned concepts may be expedited for early preparation (filtering, measurement performance, scaling trigger parameters). In one example, HOs that are more likely to cause problems (e.g. HO to/from small cells such as pico cells) may be expedited and handover failure can be avoided. In another example, HOs that are more likely to cause ping-pong (e.g. a stationary UE experiencing HO) may be reduced.

In some examples, based on the gradient evaluation, handovers involving small cells, e.g. pico cells (such as macro cell to pico cell (m2p), pico cell to macro cell (p2m), pico cell to pico cell (p2p)) may be expedited, for example, by using a shorter TTT and/or a lower offset. However, in some examples, it may not be possible to configure TTT and/or offset for each neighbour cell, whether or not it is a small cell, such as a pico cell, or a macro cell. In some examples, the UE may derive this from radio measurements e.g. a rate of change of received signal level. In some examples, the gradient may be defined as:—

Gradient=change rate of RSRP difference between target and source cell.

For example:

MathFigure 4

$$G=(\{RSRPTarget(t)-RSRPSource(t)\}-\{RSRPTarget(t-T)-RSRPSource(t-T)\})/\Delta T \quad \text{[Math.4]}$$

with ΔT=t−T and where the Gradient value is based, in this example, on:
  scaling of TTT and Offset parameters
  G<Thresh1: no scaling (normal)
  Thresh_1≤G<Thresh_2: scale (expedite HO)
  G≥Thresh_2: scale (avoid HO)
  Measurement Model, as Specified by 3GPP Standards
  Filtering for measurement evaluation
  Layer 1 324 typically provides average of last N samples to layer 3
    Typical Layer 1 filtering 1306 (B), where:
  Layer 1 obtains a measurement sample every 40 ms (illustrated at 1312),
  Every 200 ms Layer 1 calculates the average over the last 5 samples (illustrated at 1314),
  Every 200 ms Layer 1 provides a measurement result to layer 3,
  i.e. a measurement period of 200 ms is used, with N=5.
    Alternative (B'), implementing a sliding window regime 1326:
  Samples enter the layer 1 filter every 40 ms (illustrated at 1312),
  Layer 1 provides an updated filtered output result to layer 3 every 40 ms (illustrated at 1316),
  This result is again an average over last 5 samples,
  This alternative seems useful for measurement evaluation, especially with low TTT values i.e. ms40, ms64, ms80, ms100, ms128, ms160.

In some examples, layer 3 may provide additional filtering 1308. Thus, in this example, besides the last result provided by Layer 1, the new value is determined by the previous value e.g. according to the following formula:

MathFigure 5

$$F_n=(1-a)\cdot F_{n-1}+a\cdot M_n \quad \text{[Math.5]}$$

In Math Figure 5, the factor 'a' may be defined by 'k', the filter coefficient, according to, say the following:

MathFigure 6

$$a=\tfrac{1}{2}^{(k/4)} \quad \text{[Math.6]}$$

In some examples of the invention, different parameter sets may be configured by E-UTRAN for use by the UE. In one example, the different parameter sets may comprise different gradient states (e.g. normal, expedite handover, avoid handover states). In some examples, this may apply also when gradient specific Layer 3 filtering and/or ratio-based gradient state determination may be used (e.g. where the state may be determined based on a ratio of the preceding gradient values e.g. 'n' out of 'm' values). In some examples, these parameter sets may include parameters such as 'time-ToTrigger' and offsets, as well as other values may be adjusted/scaled that may determine a timing of when the UE is to initiate a measurement report. In some examples, lower values may be utilised when there is a need to perform a handover relatively quickly.

Figure 14:
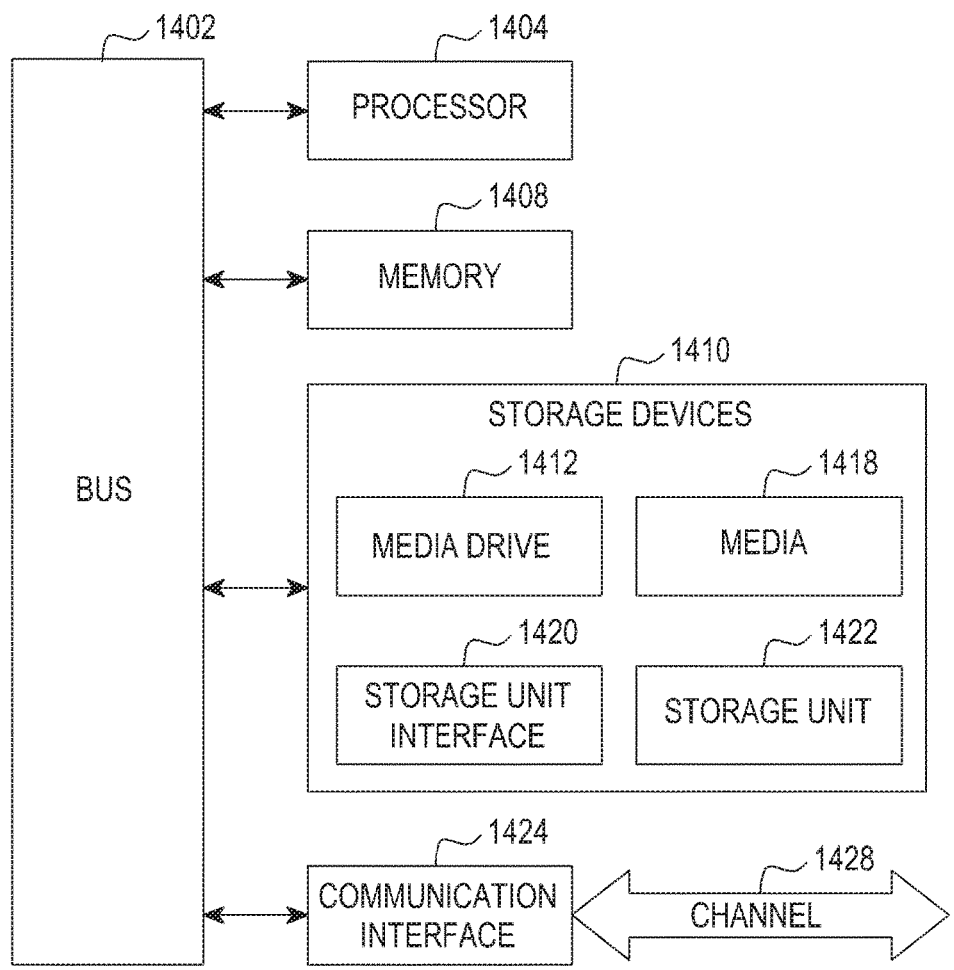
FIG. 14 illustrates a typical computing system that may be employed to implement signal processing functionality in embodiments of the invention.

Referring now to FIG. 14, there is illustrated a typical computing system 1400 that may be employed to implement signal processing functionality in embodiments of the invention. Computing systems of this type may be used in access points and wireless communication units. Those skilled in the relevant art will also recognize how to implement the invention using other computer systems or architectures. Computing system 1400 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1400 can include one or more processors, such as a processor 1404. Processor 1404 can be implemented using a general or special-purpose processing engine such as, for example, a microprocessor, microcontroller or other control module. In this example, processor 1404 is connected to a bus 1402 or other communications medium.

Computing system 1400 can also include a main memory 1408, such as random access memory (RAM) or other dynamic memory, for storing information and instructions to be executed by processor 1404. Main memory 1408 also may be used for storing temporary variables or other intermediate information during execution of instructions to be executed by processor 1404. Computing system 1400 may likewise include a read only memory (ROM) or other static storage device coupled to bus 1402 for storing static information and instructions for processor 1404.

The computing system 1400 may also include information storage system 1410, which may include, for example, a media drive 1412 and a removable storage interface 1420. The media drive 1412 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1418 may include, for example, a hard disk, floppy disk, magnetic tape, optical disk, CD or DVD, or other fixed or removable medium that is read by and written to by media drive 1412. As these examples illustrate, the storage media 1418 may include a computer-readable storage medium having particular computer software or data stored therein.

In alternative embodiments, information storage system 1410 may include other similar components for allowing computer programs or other instructions or data to be loaded into computing system 1400. Such components may include, for example, a removable storage unit 1422 and an interface 1420, such as a program cartridge and cartridge interface, a removable memory (for example, a flash memory or other removable memory module) and memory slot, and other removable storage units 1422 and interfaces 1420 that allow software and data to be transferred from the removable storage unit 1418 to computing system 1400.

Computing system 1400 can also include a communications interface 1424. Communications interface 1424 can be used to allow software and data to be transferred between computing system 1400 and external devices. Examples of communications interface 1424 can include a modem, a network interface (such as an Ethernet or other NIC card), a communications port (such as for example, a universal serial bus (USB) port), a PCMCIA slot and card, etc.

Software and data transferred via communications interface 1424 are in the form of signals which can be electronic, electromagnetic, and optical or other signals capable of being received by communications interface 1424. These signals are provided to communications interface 1424 via a channel 1428. This channel 1428 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1408, storage device 1418, or storage unit 1422. These and other forms of computer-readable media may store one or more instructions for use by processor 1404, to cause the processor to perform specified operations. Such instructions, generally referred to as 'computer program code' (which may be grouped in the form of computer programs or other groupings), when executed, enable the computing system 1400 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1400 using, for example, removable storage drive 1422, drive 1412 or communications interface 1424. The control module (in this example, software instructions or computer program code), when executed by the processor 1404, causes the processor 1404 to perform the functions of the invention as described herein.

In particular, it is envisaged that the aforementioned inventive concept can be applied by a semiconductor manufacturer to any integrated circuit for a communications unit, such as a UE, comprising measurement controller and a radio message handler. It is further envisaged that, for example, a semiconductor manufacturer may employ the inventive concept in a design of a stand-alone device, such as a UE controller or digital signal processor for a UE, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors, for example with respect to the beamforming module or beam scanning module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved communication unit and method of reducing handover failures, whilst reducing the likelihood of ping pong failures therefor have been described, wherein the aforementioned disadvantages with prior art arrangements have been substantially alleviated.

The invention claimed is:

1. A wireless communication device configured to move between communication cells, the wireless communication device comprising:
   a transceiver configured to receive instructions instructing the wireless communication device to measure a gradient change value to apply offsets based on a plurality of speed states;
   a controller configured to identify a speed state in which a moving speed of the wireless communication device is included among the plurality of speed states, obtain an offset mapped to the speed state, and recognize that the transceiver receives wireless signals from a serving cell and a neighbor cell, wherein a coverage area of the neighbor cell is located in a coverage area of the serving cell and the coverage area of the neighbor cell is smaller than the coverage area of the serving cell;
   a layer-1 filtering device configured to perform layer-1 filtering on the wireless signals at a physical layer;
   a first layer-3 filtering device configured to perform layer-3 filtering on the layer-1 filtered signals at a radio resource control layer to produce first layer-3 filtered signals;
   a gradient calculation device coupled to the first layer-3 filtering device, wherein the gradient calculation device configured to calculate the gradient change value corresponding to the obtained offset;
   a second layer-3 filtering device configured to perform layer-3 filtering on the first layer-3 filtered signals based on the calculated gradient change value to produce second layer-3 filtered signals;
a scaling calculation device configured to calculate a scaling factor based on the second layer-3 filtered signals; and
a measurement evaluation device configured to perform measurement evaluation on the first layer-3 filtered signals based on the calculated scaling factor,
wherein the gradient change value indicates a change rate of received signal strength difference between the wireless signals from the neighbor cell and the serving cell.

2. The wireless communication device of claim 1, wherein the second layer-3 filtering device is configured to apply a filtering coefficient indicating the calculated gradient change value.

3. The wireless communication device of claim 1, wherein the gradient calculation device is configured to calculate the change rate of received signal strength difference at substantially equal time intervals.

4. The wireless communication device of claim 1, wherein the layer-1 filtering device comprises at least a first output and a second output,
wherein the first output is provided to the measurement evaluation device via at least a first portion of the first layer-3 filtering device and the second output is provided to the measurement evaluation device via the gradient calculation device, and
wherein the first output is configured to provide an update to the measurement evaluation device by a predetermined period.

5. The wireless communication device of claim 1, wherein the scaling calculation device is configured to determine from a number (m) of samples of the gradient change value whether a minimum portion (n) of the number of samples is reached to trigger a scaling operation, scale the gradient change value to expedite handover in response to the minimum portion (n) exceeding a first threshold and avoid handover if the minimum portion (n) exceeds a second threshold.

6. The wireless communication device of claim 1, wherein the second layer-3 filtering device is divided into a plurality of filtering units, with at least one of a plurality of filtering units is configured to apply the layer-3 filtering after or before the gradient calculation device calculates the gradient change value, and
wherein an output of the at least one of the plurality of filtering units configured to apply the layer-3 filtering before the gradient calculation device is only used as an input for the gradient calculation device.

7. The wireless communication device of claim 1, wherein the offsets includes at least one dedicated offset mapped to each of the plurality of speed states.

8. The wireless communication device of claim 1, wherein the speed state is identified based on a number of cell change in a period,
wherein the speed state comprises a first state, a second state, and a third state, and
wherein if the number of cell change exceeds a maximum threshold in the period, the speed state is identified as the first state, if the number of cell change exceeds a medium threshold in the period, the speed state is identified as the second state, and if the number of cell change is included in conditions for the first state and the second state, the speed state is identified as the third state.

9. A method for moving between communication cells by a wireless communication device, the method comprising:

receiving instructions instructing that the wireless communication device is to measure a gradient change value to apply offsets based on a plurality of speed states;
identifying a speed state in which a moving speed of the wireless communication device is included among the plurality of speed states;
obtaining an offset mapped to the speed state;
receiving wireless signals from a serving cell and a neighbor cell, wherein a coverage area of the neighbor cell is located in a coverage area of the serving cell and the coverage area of the neighbor cell is smaller than the coverage area of the serving cell;
performing layer-1 filtering, by a layer-1 filtering device, on the wireless signals at a physical layer;
performing first layer-3 filtering, by a first layer-3 filtering device, on the layer-1 filtered signals at a radio resource control layer to produce first layer-3 filtered signals;
calculating, by a gradient calculation device, the gradient change value corresponding to the obtained offset;
performing second layer-3 filtering, by a second layer-3 filtering device, on the first layer-3 filtered signals based on the calculated gradient change value to produce second layer-3 filtered signals;
calculating, by a scaling calculation device, a scaling factor based on the second layer-3 filtered signal; and
performing, by a measurement evaluation device, measurement evaluation on the first layer-3 filtered signals based on the calculated scaling factor,
wherein the gradient change value indicates a change rate of received signal strength difference between the wireless signals from the neighbor cell and the serving cell.

10. The method of claim 9, wherein the offsets includes at least one dedicated offset mapped to each of the plurality of speed states.

11. The method of claim 9, wherein the speed state is identified based on a number of cell change in a period,
wherein the speed state comprises a first state, a second state, and a third state, if the number of cell change exceeds a maximum threshold in the period, the speed state is identified as the first state, if the number of cell change exceeds a medium threshold in the period, the speed state is identified as the second state, and if the number of cell change is included in conditions for the first state and the second state, the speed state is identified as the third state.

12. The method of claim 9, wherein the second layer-3 filtering is applied a filtering coefficient indicating the calculated gradient change value.

13. The method of claim 9, wherein the change rate of received signal strength difference is calculated at substantially equal time intervals.

14. The method of claim 9, wherein the first layer-3 filtered signals are configured to provide an update to the measurement evaluation device by a predetermined period.

15. The method of claim 9, wherein the scaling calculation device is configured to determine from a number (m) of samples of the gradient change value whether a minimum portion (n) of the number of samples is reached to trigger a scaling operation, scale the gradient change value to expedite a handover in response to the minimum portion (n) exceeding a first threshold and avoid the handover if the minimum portion (n) exceeds a second threshold.

16. A base station to control a wireless communication device moving between communication cells, the base station comprising:

a signal processing device configured to generate instructions to instruct that the wireless communication device to measure a gradient change value to apply offsets based on a plurality of speed states;

a processor configured to specify a minimum scaling factor for applying to scaling of the gradient change value at the wireless communication device; and a transceiver configured to send the instructions and the minimum scaling factor to the wireless communication device and receive a measurement report from the wireless communication device, wherein the gradient change value indicates a change rate of received signal strength difference between wireless signals from a neighbor cell and a serving cell, wherein the instructions further instruct the wireless communication device to perform at least one of unfiltered measurement or at least one measurement to be filtered at both physical layer and a radio resource control layer where filtering is applied to the gradient change value, and wherein the measurement report is generated by performing measurement evaluation on first layer-3 filtered signals based on a calculated scaling factor, the first layer-3 filtered signals are output from first layer-3 filtering on layer-1 filtered signals at a radio resource control layer, the calculated scaling factor is calculated based on second layer-3 filtered signal, the layer-1 filtered signals are output from layer-1 filtering on the wireless signals at a physical layer, and the second layer-3 filtered signals are output from second layer-3 filtering on the first layer-3 filtered signals based on the gradient change value.

17. The base station of claim 16, wherein the instructions further comprise at least one of an indication of a type of measurement for the wireless communication device to perform based on a measurement gradient or an upper value to apply for each of a plurality of measurement gradient levels corresponding to the gradient change value.

18. The base station of claim 16, wherein the offsets includes at least one dedicated offset mapped to each of the plurality of speed states.

19. The base station of claim 16, wherein the speed state is identified based on a number of cell change in a period,
wherein the speed state comprises a first state, a second state, and a third state, and
wherein if the number of cell change exceeds a maximum threshold in the period, the speed state is identified as the first state, if the number of cell change exceeds a medium threshold in the period, the speed state is identified as the second state, and if the number of cell change is included in conditions for the first state and the second state, the speed state is identified as the third state.

20. A method to control a wireless communication device moving between communication cells by a base station, the method comprising:
generating instructions to instruct that the wireless communication device measure a gradient change value, wherein the gradient change value indicates a change rate of received signal strength difference between wireless signals from a neighbor cell and a serving cell, and wherein the instructions further instruct at least one of unfiltered measurement or at least one measurement to be filtered at both a physical layer and filtered a radio resource control layer where filtering is applied to the gradient change value;
specifying a minimum scaling factor for applying to scaling of the gradient change value at the wireless communication device;
transmitting, to the wireless communication device, the instructions and the minimum scaling factor; and
receiving, from the wireless communication device, a measurement report, wherein the measurement report is generated by performing measurement evaluation on first layer-3 filtered signals based on a calculated scaling factor, the first layer-3 filtered signals are output from first layer-3 filtering on layer-1 filtered signals at a radio resource control layer, the calculated scaling factor is calculated based on a second layer-3 filtered signal, the layer-1 filtered signals are output from layer-1 filtering on the wireless signals at a physical layer, and the second layer-3 filtered signals are output from second layer-3 filtering on the first layer-3 filtered signals based on the gradient change value.

21. The method of claim 20, wherein the gradient change value is to apply offsets based on a plurality of speed states and wherein the offsets includes at least one dedicated offset mapped to each of the plurality of speed states.

22. The method of claim 20, further comprising identifying a speed state in which a moving speed of the wireless communication device is included among a plurality of speed states, wherein the speed state is identified based on a number of cell change in a period,
wherein the speed state comprises a first state, a second state, and a third state, and
wherein if the number of cell change exceeds a maximum threshold in the period, the speed state is identified as the first state, if the number of cell change exceeds a medium threshold in the period, the speed state is identified as the second state, and if the number of cell change is included in conditions for the first state and the second state, the speed state is identified as the third state.

* * * * *